United States Patent
Hagiwara et al.

(10) Patent No.: US 10,267,254 B2
(45) Date of Patent: Apr. 23, 2019

(54) ENGINE DEVICE

(71) Applicant: Yanmar Co., Ltd., Osaka-shi, Osaka-fu (JP)

(72) Inventors: Ryoichi Hagiwara, Osaka (JP); Osamu Yamagishi, Osaka (JP); Naoya Ikeda, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/760,591

(22) PCT Filed: May 24, 2016

(86) PCT No.: PCT/JP2016/065256
§ 371 (c)(1),
(2) Date: Mar. 15, 2018

(87) PCT Pub. No.: WO2017/047163
PCT Pub. Date: Mar. 23, 2017

(65) Prior Publication Data
US 2018/0298840 A1     Oct. 18, 2018

(30) Foreign Application Priority Data
Sep. 16, 2015   (JP) .................................. 2015-182484

(51) Int. Cl.
*F02P 5/00*     (2006.01)
*F02D 41/22*    (2006.01)
(Continued)

(52) U.S. Cl.
CPC ........... *F02D 41/222* (2013.01); *B63H 21/21* (2013.01); *F02B 43/00* (2013.01); *F02B 43/04* (2013.01);
(Continued)

(58) Field of Classification Search
CPC .... F02D 41/222; F02D 19/10; F02D 41/1401; F02D 41/0027; F02D 19/025;
(Continued)

(56) References Cited

U.S. PATENT DOCUMENTS

| | | | | |
|---|---|---|---|---|
| 4,386,427 A | * | 5/1983 | Hosaka | F02D 41/266 701/114 |
| 4,587,615 A | * | 5/1986 | Takahashi | F02D 41/222 123/479 |
| 4,984,455 A | * | 1/1991 | Koyama | F02D 41/0097 73/114.25 |

FOREIGN PATENT DOCUMENTS

| | | |
|---|---|---|
| JP | 63-045409 A | 2/1988 |
| JP | 03-037356 A | 2/1991 |

(Continued)

OTHER PUBLICATIONS

International Search Report dated Aug. 30, 2016 issued in corresponding PCT Application PCT/JP2016/065256.

*Primary Examiner* — Hung Q Nguyen

(57) ABSTRACT

An engine device of including: an intake manifold configured to supply air into a cylinder; a gas injector configured to mix fuel gas with air supplied from the intake manifold, and supply mixed gas to the cylinder; an igniter configured to ignite, in the cylinder, premixed fuel obtained by premixing the fuel gas with the air; and a control unit configured to execute a combustion control of a premixed fuel based on the output signal indicative of an output from the engine device. When the air amount is determined to be insufficient and when the output signal is lost, the control unit estimates an output signal based on the fuel gas injection amount from the gas injector, and executes the combustion control based on the estimated output signal.

6 Claims, 29 Drawing Sheets

(51) Int. Cl.
*F02B 43/00* (2006.01)
*F02M 21/02* (2006.01)
*F02D 41/14* (2006.01)
*F02D 19/02* (2006.01)
*F02D 41/00* (2006.01)
*F02D 19/10* (2006.01)
*B63H 21/21* (2006.01)
*F02B 43/04* (2006.01)
*F02B 69/04* (2006.01)
*F02M 21/04* (2006.01)
*F02D 29/06* (2006.01)
*F02D 25/00* (2006.01)

(52) U.S. Cl.
CPC ............ *F02B 69/04* (2013.01); *F02D 19/025* (2013.01); *F02D 19/10* (2013.01); *F02D 41/0027* (2013.01); *F02D 41/1401* (2013.01); *F02M 21/02* (2013.01); *F02M 21/04* (2013.01); *B63H 2021/216* (2013.01); *F02D 25/00* (2013.01); *F02D 29/06* (2013.01); *F02D 41/0025* (2013.01); *F02D 2041/1433* (2013.01); *F02D 2041/227* (2013.01); *F02D 2200/1004* (2013.01); *Y02T 10/36* (2013.01)

(58) Field of Classification Search
CPC ................ F02D 41/0025; F02D 25/00; F02D 2041/1433; F02D 2200/1004; F02D 29/06; F02D 2041/227; B63H 21/21; B63H 2021/216; F02B 43/04; F02B 69/04; F02B 43/00; F02M 21/04; F02M 21/02; Y02T 10/36
See application file for complete search history.

(56) References Cited

FOREIGN PATENT DOCUMENTS

| | | |
|---|---|---|
| JP | 1992-054977 U | 5/1992 |
| JP | 10-061460 A | 3/1998 |
| JP | 10-131799 A | 5/1998 |
| JP | 2000-328995 A | 11/2000 |
| JP | 2002-004899 A | 1/2002 |
| JP | 2003-262139 A | 9/2003 |
| JP | 2006-125326 A | 5/2006 |
| JP | 4060897 B | 3/2008 |
| JP | 2010-163950 A | 7/2010 |
| JP | 2015-086729 A | 5/2015 |
| JP | 2015-161201 A | 9/2015 |
| JP | 2015-161202 A | 9/2015 |
| JP | 2015-161203 A | 9/2015 |

* cited by examiner

ENGINE DEVICE

CROSS REFERENCES TO RELATED APPLICATIONS

This application is a national stage application pursuant to 35 U.S.C. § 371 of International Application No. PCT/JP2016/065256, filed on May 24, 2016, which claims priority under 35 U.S.C. § 119 to Japanese Patent Application No. 2015-182484, filed on Sep. 16, 2015, the disclosures of which are hereby incorporated by reference in their entireties.

TECHNICAL FIELD

The present invention relates to an engine device to serve as a drive source, and particularly relates to an engine device configured to rotate an output shaft through combustion of a fuel gas.

BACKGROUND ART

Traditionally, diesel engines are used as a drive source of vessels such as tankers or transport ships and onshore power generation facilities. However, the exhaust gas of the diesel engine contains a large amount of nitrogen oxides, sulfur oxides, particulate matter, and the like which are harmful substances hindering preservation of the environment. For this reason, in recent years, gas engines that can reduce the amount of harmful substances generated are becoming prevalent as an alternative engine for diesel engines.

A so-called gas engine that generates power by using a fuel gas such as natural gas supplies a mixed gas obtained by mixing a fuel gas with the air to a cylinder and combust the same (see Patent Literature 1 and Patent Literature 2; hereinafter PTL 1 and PTL 2, respectively). Further, as an engine device combining the characteristics of a diesel engine and characteristics of a gas engine, there is a dual-fuel engine which allows a use of a premixed combustion mode in which a mixture of a gaseous fuel (fuel gas) such as natural gas and air is supplied to a combustion chamber and combusted, in combination with a diffusion combustion mode in which a liquid fuel such as crude oil is injected into the combustion chamber and combusted (see patent Literature 3 and Patent Literature 4; hereinafter, PTL 3 and PTL 4, respectively).

CITATION LIST

Patent Literature

PTL 1: Japanese Patent Application Laid-Open No. 2003-262139
PTL 2: Japanese Patent No. 4060897
PTL 3: Japanese Patent Application Laid-Open No. 2002-004899
PTL 4: Japanese Patent Application Laid-Open No. 2015-086729

SUMMARY OF INVENTION

Technical Problem

In a traditional engine device, target values of an intake manifold pressure, gas pressures of a sub chamber and a main chamber in each gas column are set based on output signals from the engine device, and a combustion control in the gas column is executed. Therefore, when the output signal is lost, the engine device faces difficulty in continuing its operation, and needed to be urgently stopped.

However, while an emergency stop of the engine device is possible in an on-land system such as a generator device, an engine device of a ship needs to ensure propulsion means to sustain navigation of the ship even in case of emergency to prevent the ship from getting lost, and an auxiliary engine is provided for this reason. Further, such a back-up system involving an auxiliary engine is also built in an on-land system to prevent a shutdown of the entire system caused by an emergency stop of the engine device.

Further, even if the back-up system involving an auxiliary engine is provided, the operation of the engine device needs to be sustained until the operation of the auxiliary engine is stabilized. Therefore, the operation of the engine device in which output signals are lost has to be maintained until the operation of the auxiliary engine is started. However, when the engine device having lost its output signals is operated, there is no guideline parameter for controlling, and therefore the output may be excessively larger than a target value, or the engine device may be stopped.

Further, the dual-fuel engine or the gas engine driven in the premixed combustion mode requires controlling of a proper air-fuel ratio (air flow rate/fuel flow rate) to a proper value, because a knocking region and a misfire region with respect to the air-fuel ratio increase with an increase in the output. If the air-fuel ratio deviates from a proper value, for example, an excessively high air flow rate (a large air-fuel ratio) leads to misfire, causing unstable rotation number of the engine, eventually causing the engine to stop. On the other hand, an excessively low air flow rate (a small air-fuel ratio) causes a knocking, which leads to damage to a component (piston, liner, and the like) of the engine. Knocking takes place when a non-combusting part becomes a high temperature and high pressure, leading to self-ignition, in the process of flame propagation in the cylinder.

Knocking can be avoided by delaying (retarding) the ignition timing. This is because retarding the ignition timing delays the combustion start timing from the proper value, thus slowing the combustion. However, when the combustion operation of the premixed combustion mode is taking place in the gas engine or the dual-fuel engine, avoiding the knocking by retarding the ignition timing causes a problem that the combustion efficiency is lowered.

Particularly, in a large-size engine device for ships and for using in an electric power generator, since the volume of the intake manifold is large, the response of the amount of air supplied from the intake manifold delays with respect to the controlled variable. Therefore, unlike the gasoline engine and the like for automobiles, controlling a large-size engine device using the gas engine or the dual-fuel engine based on detection of occurrence of the knocking causes not only a difficulty in setting of the ignition timing according to the required air amount, but also difficulty in setting the ignition timing according to the current air amount. Therefore, although knocking can be restrained after the occurrence of knocking, there will be not only a problem that the occurrence of knocking cannot be predicted, but also a problem that the combustion efficiency is lowered.

In view of the current circumstances described above, it is a technical object of the present invention to provide an improved engine device.

Solution to Problem

An aspect of the present invention is an engine device, including an intake manifold configured to supply air into a cylinder, a gas injector configured to mix fuel gas with air supplied from the intake manifold, and supply mixed gas to the cylinder, and an igniter configured to ignite, in the cylinder, premixed fuel obtained by pre-mixing the fuel gas with the air, the engine device including a control unit configured to execute a combustion control of a premixed fuel based on an output signal indicative of an output from the engine device, wherein when the output signal is lost, the control unit estimates an output signal based on a fuel gas injection amount from the gas injector, and executes the combustion control based on the estimated output signal.

The above engine device may be such that the control unit sets a target value of an intake manifold pressure based on an output signal, and executes the combustion control. The above engine device may be such that the control unit sets a target value of a fuel gas injection amount based on an output signal, and executes the combustion control.

The above engine device may be such that, when the output signal is lost, the control unit executes the combustion control based on the estimated signal, until a separate auxiliary engine starts its operation.

The above engine device may be a gas engine configured to drive and rotate a generator, and the control unit receives an output from the generator as an output signal and executes the combustion control.

The above engine device may be a dual-fuel engine capable of selecting a gaseous fuel or a liquid fuel, and the control unit receives an engine torque as an output signal and executes the combustion control.

The above-described engine device may include a control unit configured to determine insufficiency in an air amount of the premixed fuel in the cylinder, wherein the control unit performs in multiple steps retard control of ignition timing by the igniter, when the air amount is determined as to be insufficient, and performs in multiple steps advance control of the ignition timing, when the air amount is determined as to be sufficient. With this, the ignition timing is subjected to retard control in multiple steps when the air amount is insufficient. This can not only reduce the occurrence of knocking, but also prevent the ignition timing from being overly retarded, and suppress deterioration in combustion efficiency. Further, since the ignition timing is set by predicting surplus and shortage in the air amount in the intake manifold, the ignition timing is suitably set even in a structure, such as a large engine, having a large volume intake manifold. Therefore, while deterioration in the combustion efficiency of the engine device can be suppressed, the occurrence of knocking can be suppressed, hence achieving a stable operation.

The engine device may be adapted so that the control unit stops the retard control when a retard limit value is reached in the retard control, and stops the advance control when the ignition timing becomes that of an ordinary operation in the advance control.

The engine device may be adapted so that the control unit receives, as a measured pressure, an intake manifold pressure measured in the intake manifold, and determines that the air amount is insufficient when a difference obtained by subtracting the measured pressure from a target pressure which is a target value for the intake manifold is higher than a predetermined differential pressure. The engine device may be adapted so that the control unit receives as a measured flow rate an air flow rate measured in the intake manifold, and determines that the air amount is insufficient when a difference obtained by subtracting the measured flow rate from a target flow rate which is a target value for the intake manifold is higher than a predetermined differential flow rate. The engine device may be adapted so that the control unit determines that the air amount is insufficient when an output variation amount of the engine is greater than a predetermined amount.

Advantageous Effects of Invention

In the aspect of the present invention, a combustion control is executed based on an estimated output signal, so that an emergency stop of the engine device at a time of output-loss can be prevented. Therefore, in cases of an engine device for a ship for example, since an output from the engine device can be ensured even in an emergency of losing an output signal, propulsion means for sustaining navigation of the ship can be ensured, and a risk of getting lost and the like can be prevented.

Further, with the aspect of the present invention, the engine device whose output has been lost can be operated temporarily until a transition to the operation of the auxiliary engine. Therefore, even when the engine device is in the output-lost state, the ship or the generator having the engine device will not be stopped. Therefore, even when the output signal of the engine device is lost, an emergency stop can be avoided and transition to the operation of the auxiliary engine device can be reliably made. Therefore, navigation of the ship having such an engine device or output of the generator having the engine device can be safely sustained.

DESCRIPTION OF EMBODIMENTS

The following description is based on drawings showing an application of an embodiment embodying the present invention to an electric power generating mechanism mounted in an electric propulsion ship.

Figure 1:
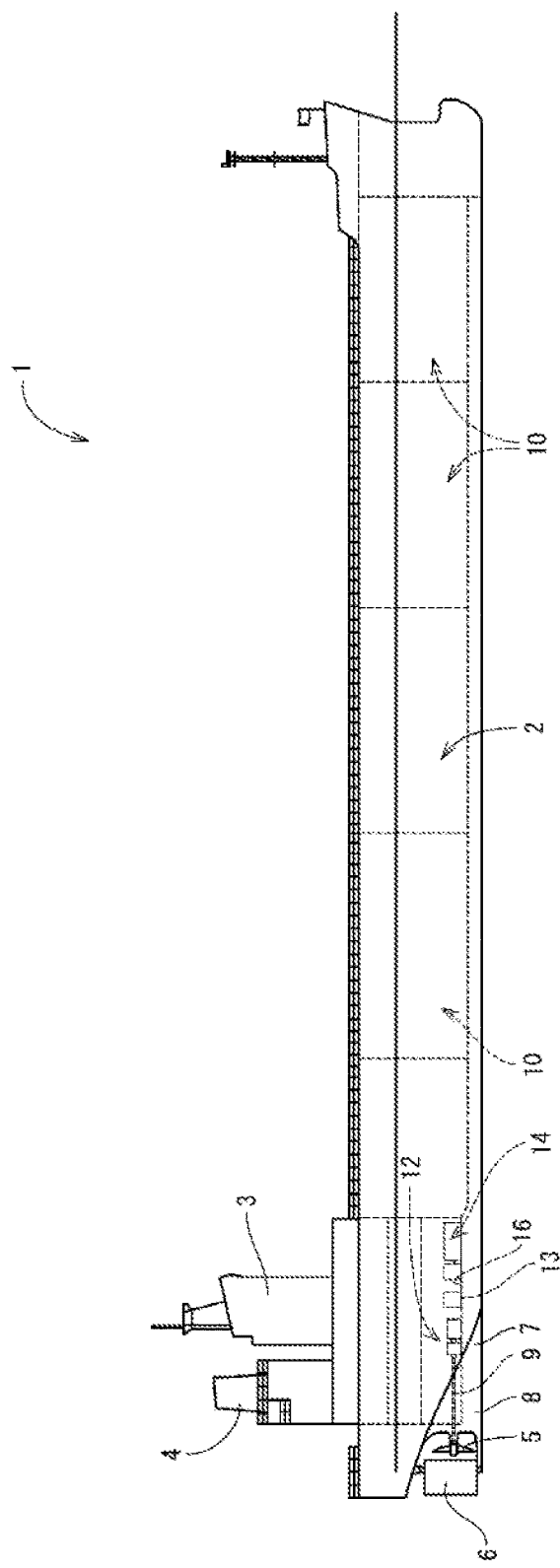
FIG. 1 An overall side view of a ship in an embodiment of the present invention.
Figure 2:
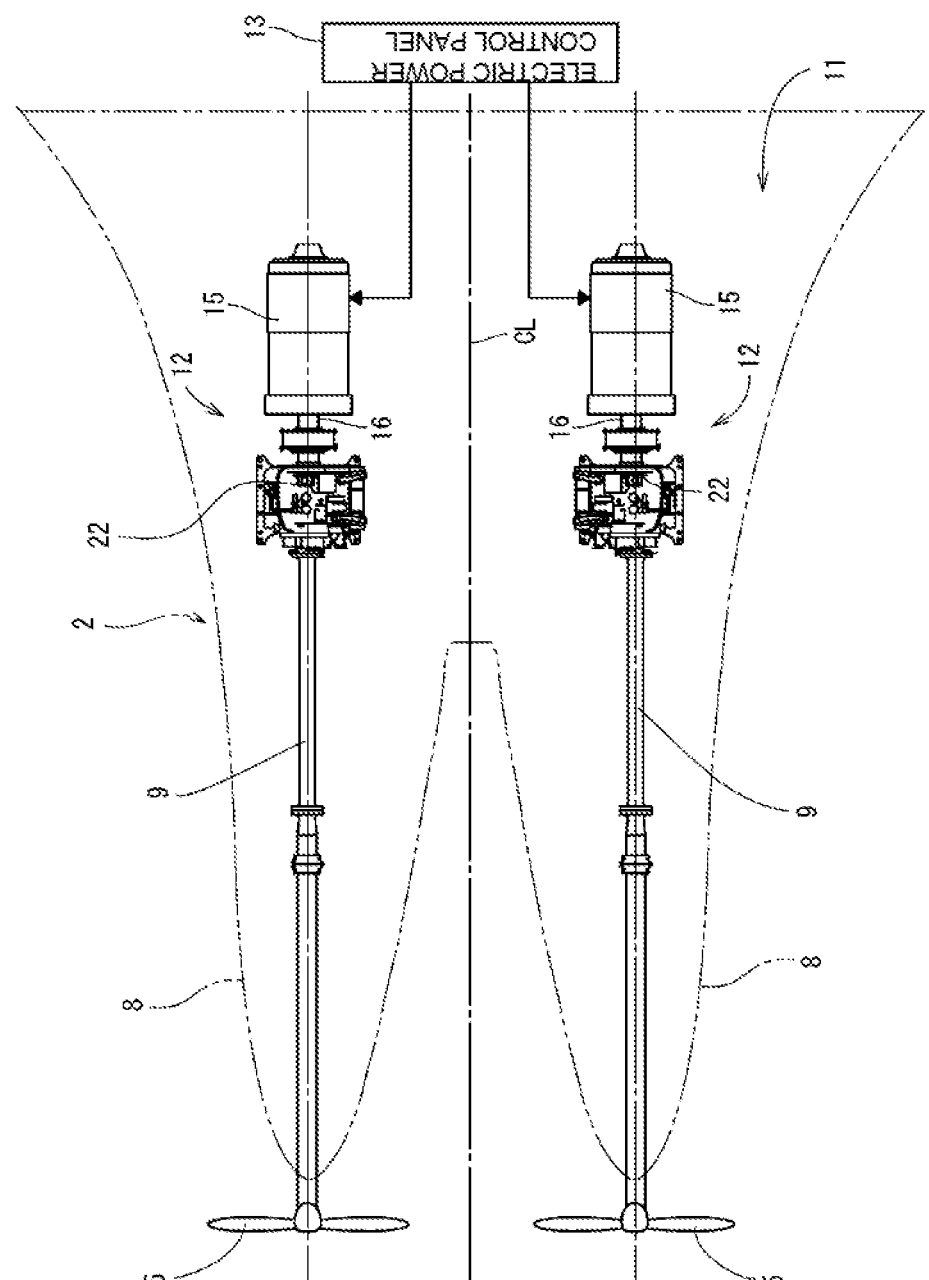
FIG. 2 An explanatory plan view of the engine room.
Figure 3:
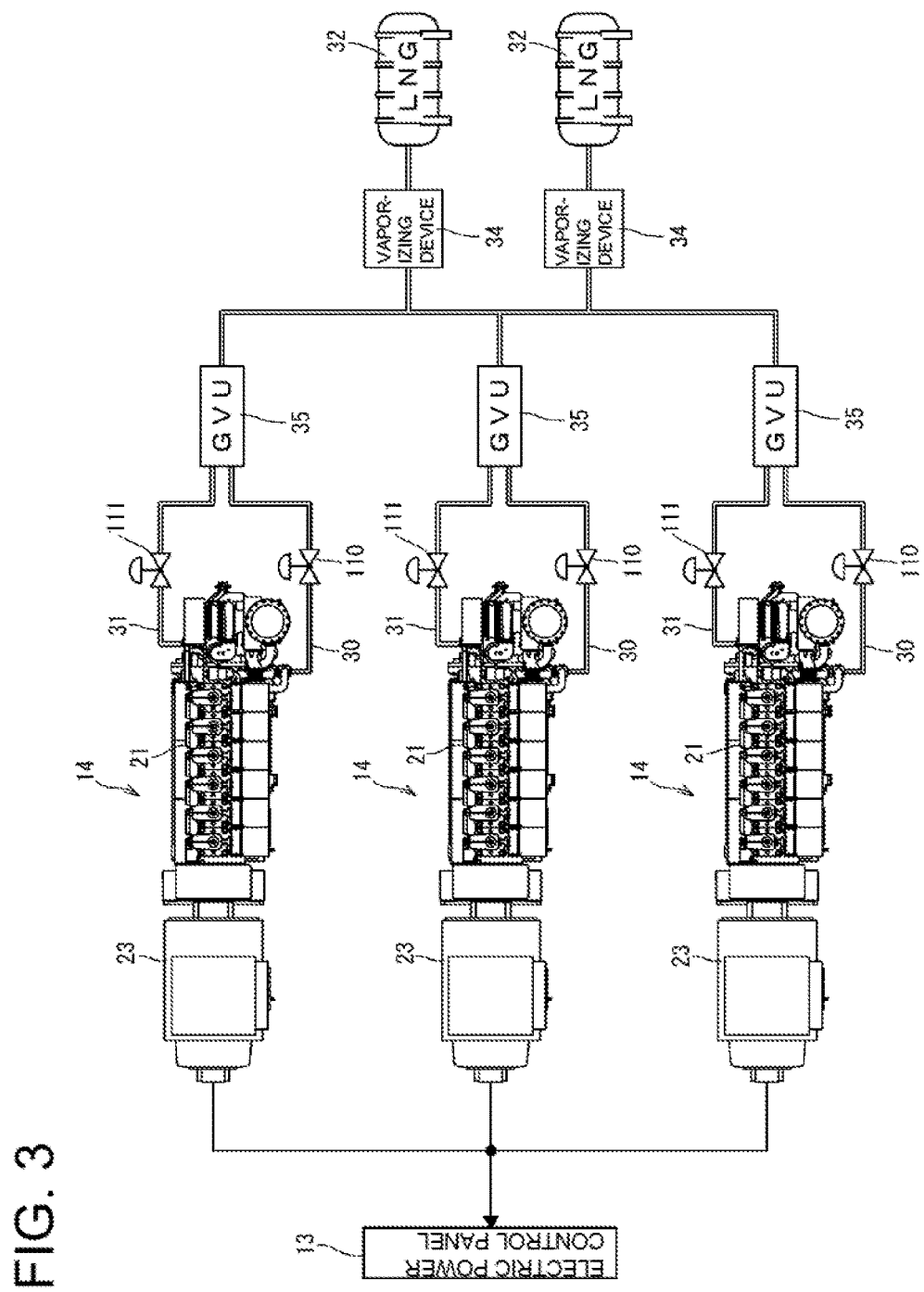
FIG. 3 A schematic view showing a structure of a fuel supply path of an engine device in the embodiment of the present invention.

First, an overview of the ship is described. As shown in FIG. 1 to FIG. 3, the ship 1 of the present embodiment includes: a ship hull 2, a cabin 3 (bridge) provided on the stern side of the ship hull 2, a funnel 4 (chimney) positioned behind the cabin 3, and a pair of propellers 5 and a rudder 6 provided on a lower back portion of the ship hull 2. In this case, a pair of skegs 8 are integrally formed on the ship bottom 7 on the stern side. On each of the skegs 8, a propeller shaft 9 for driving to rotate the propeller 5 is pivotally supported. The skegs 8 are symmetrically formed on the left and right, with respect to the ship hull center line CL (see FIG. 3) which divides the lateral width direction of the ship hull 2. That is, the first embodiment adopts a twin skeg as the stern shape of the ship hull 2.

On a bow side and a middle part of the ship hull 2, a hold 10 is provided. On the stern side of the ship hull 2, an engine room 11 is provided. In the engine room 11, a pair of propulsion mechanisms 12 each serving as a drive source for propeller 5 is positioned on the left and right across the ship hull center line CL. The rotary power transmitted from each propulsion mechanism 12 to the propeller shaft 9 drives and rotates the propeller 5. The engine room 11 includes: an electric power control panel 13 which controls power supply to the propulsion mechanism 12 and the like; and a plurality of electric power generating mechanisms 14 (3 units in the present embodiment) each configured to generate electric power to be supplied through the electric power control panel 13. The inside of the engine room 11 is parted relative to the up and down directions, by a deck and an inner bottom plate. The propulsion mechanisms 12, the electric power control panel 13, and the electric power generating mechanism 14 of the first embodiment are installed on the inner bottom plate at the lower most stage of the engine room 11. It should be noted that, although details are not illustrated, the hold 10 is divided into a plurality of compartments.

As shown in FIG. 2 and FIG. 3, each propulsion mechanism 12 includes: a propulsion motor device 15 (dual-fuel engine, in the embodiment) which serves as a drive source of the propeller 5; and a speed reducer 22 configured to transmit power of the propulsion motor device 15 to the propeller shaft 9. Further, the electric power generating mechanism 14 is a combination of a generator 23 configured to generate electric power to be supplied, and a medium-speed engine device 21 serving as a drive source of the generator 23. The term "medium-speed" engine herein means one that drives at a rotational speed of approximately 500 to 1000 times per minute. In this connection, a "low-speed" engine drives at a rotational speed of 500 times or less per minute, and a "high-speed" engine drives at a rotational speed of 1000 times or more per minute. The engine device 21 of the embodiment is configured to drive at a constant speed within a range of medium-speed (approximately 700 to 750 times per minute).

From the rear surface side of the engine device 21, a rear end side of an engine output shaft 24 protrudes. On the rear end side of the engine output shaft 24, the generator 23 is coupled in such a manner as to be capable of transmitting power. In the electric power generating mechanism 14, the generator 23 is driven and rotated by the engine device 21 so that the generator 23 feeds generated electric power to the electric power control panel 13. The electric power control panel 13 partially supplies the electric power fed from the generator 23 to the propulsion motor device 15, thereby driving and rotating the propulsion motor device 15. Further, the electric power control panel 13 also supplies electric power generated by the generator 23 to an electric system in the ship hull 2 other than the propulsion motor device 15.

The power of the propulsion motor device 15 which is driven to rotate based on the electric power from the electric power control panel 13 is transmitted from the rear end side of the motor output shaft 16 to the propeller shaft 9, via the speed reducer 22. Part of the power of the propulsion motor device 15 is speed-reduced by the speed reducer 22, while being transmitted to the propeller shaft 9. The propeller 5 is driven and rotated by the speed-reduced power from the speed reducer 22. It should be noted that, as the propeller 5, a variable-pitch propeller capable of adjusting the ship speed through changing the blade angles of the propeller blades.

Figure 4:
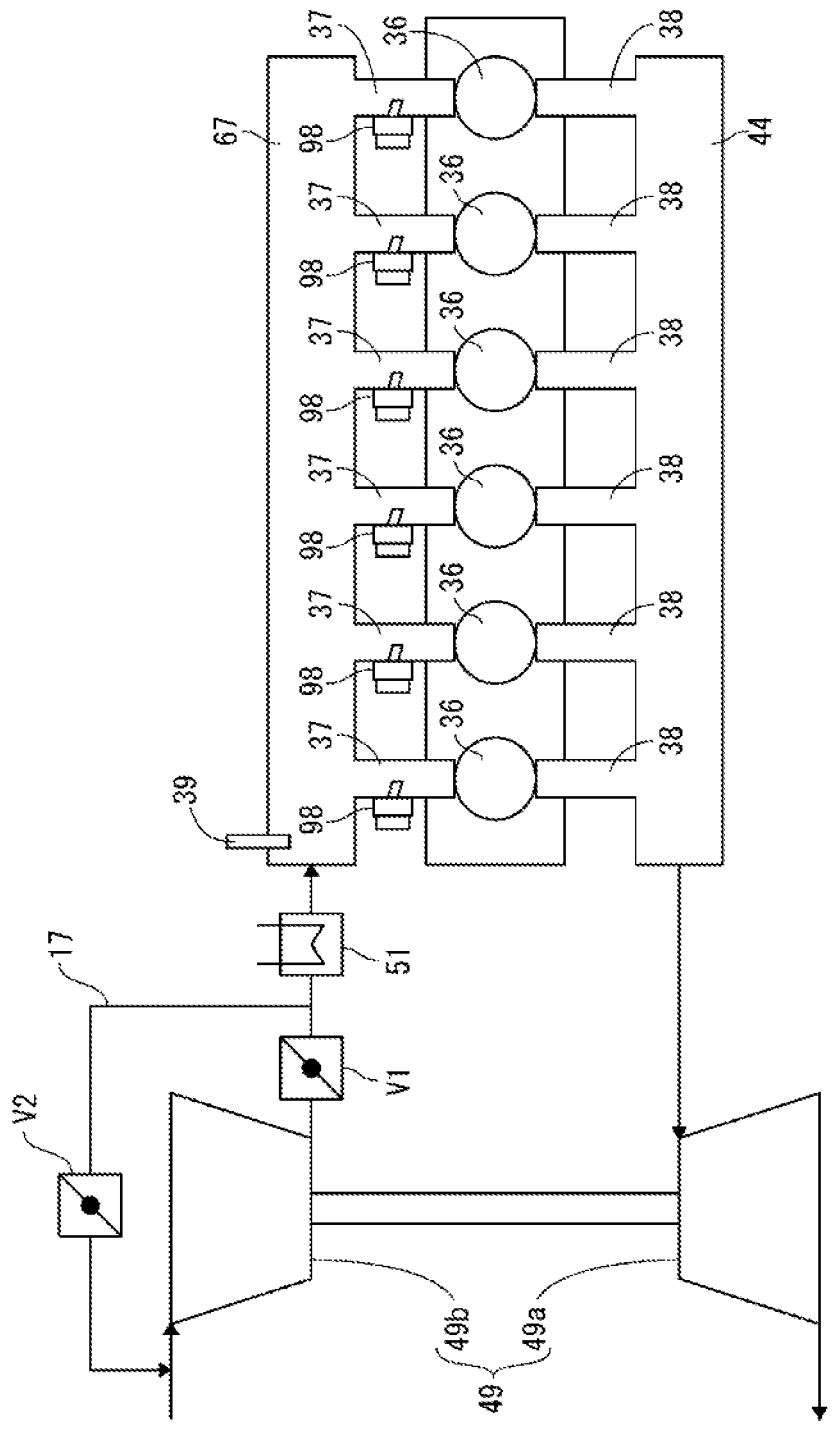
FIG. 4 A schematic view showing a structure of an intake/exhaust passage of an engine device in an embodiment of the present invention.
Figure 5:
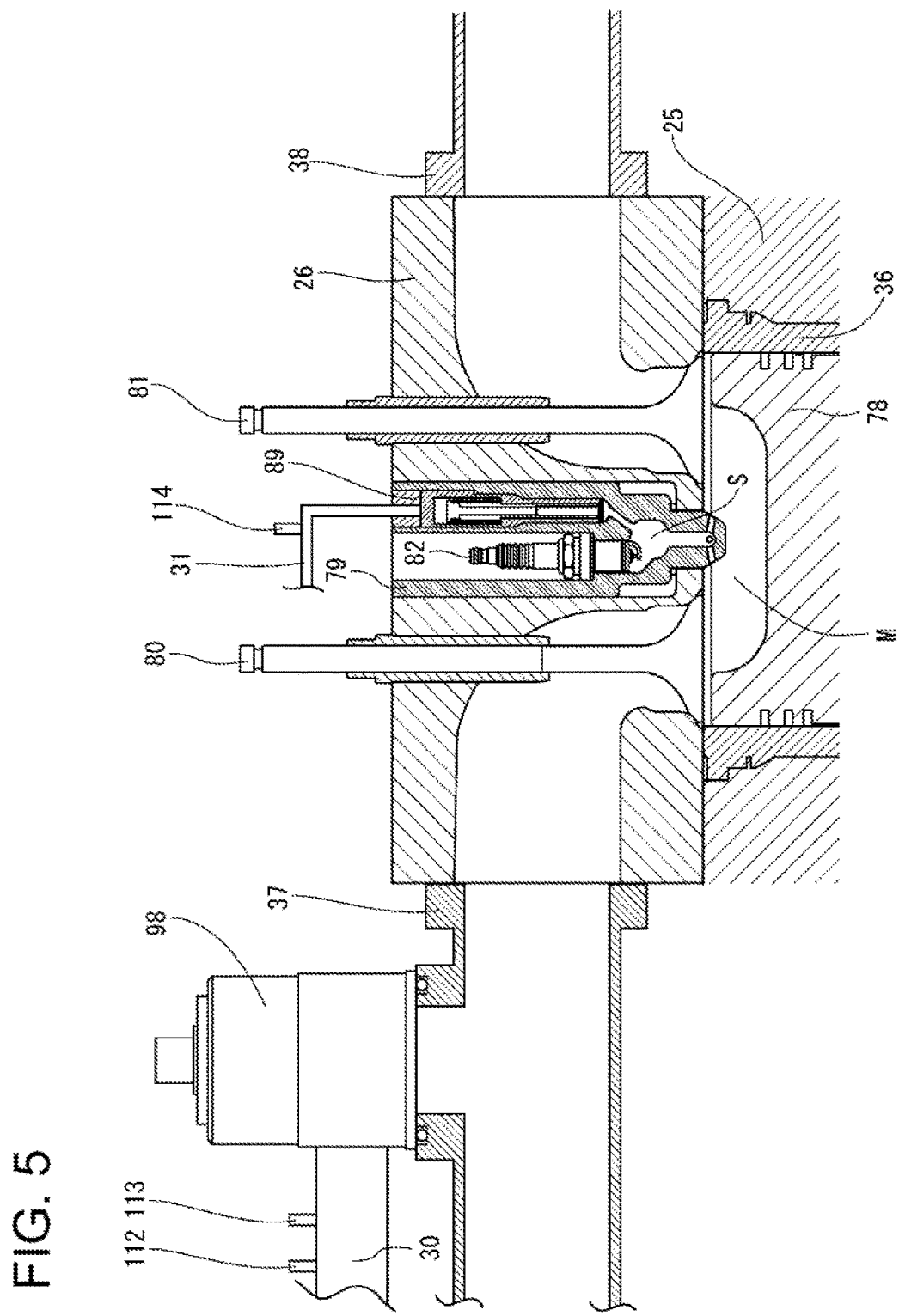
FIG. 5 A schematic view schematically illustrating the inside of a cylinder head in the engine device.
Figure 6:
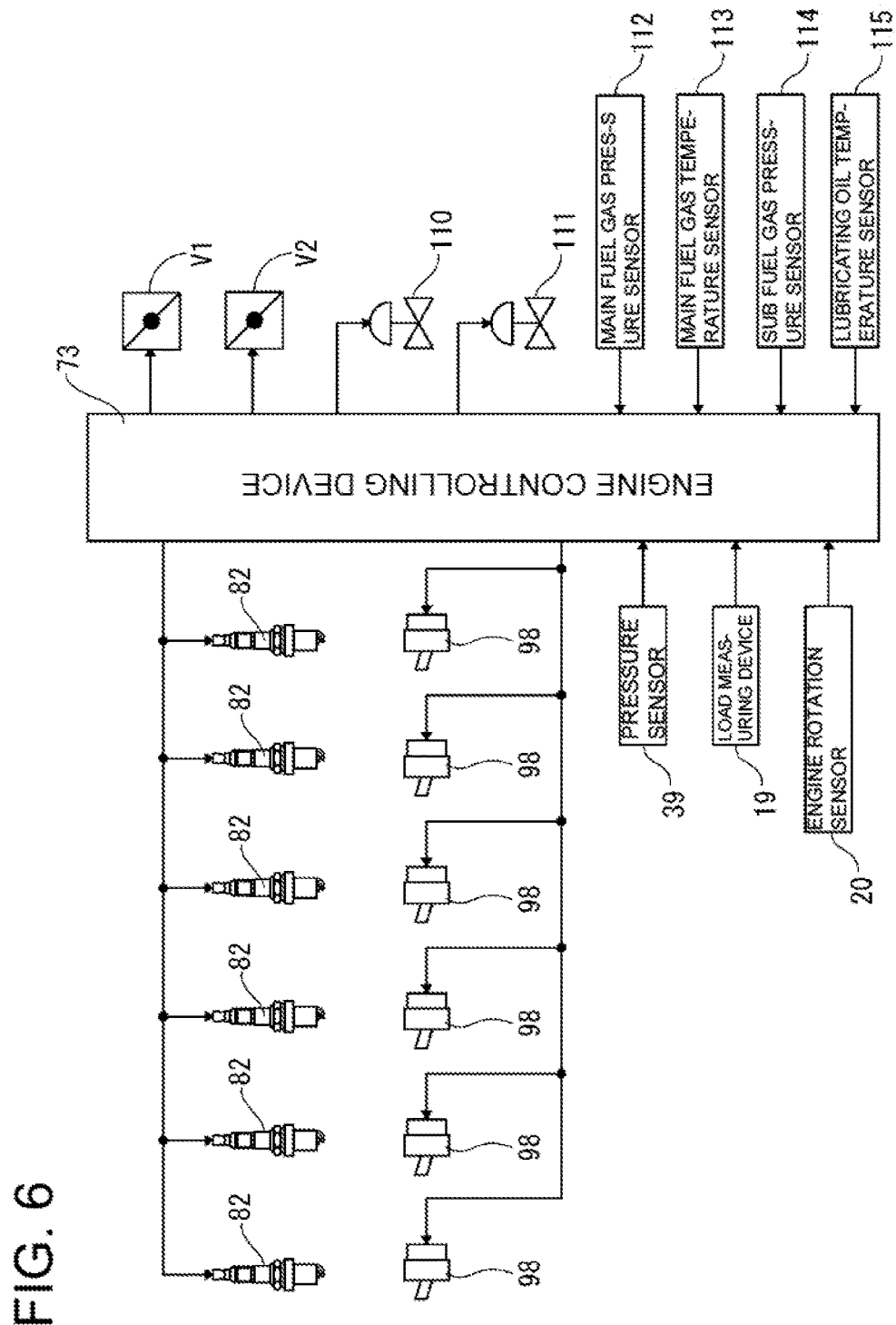
FIG. 6 A control block diagram of the engine device.

Next, the following describes, with reference to FIG. 3 to FIG. 9, a structure of a gas engine which is an engine device used as the electric power generating mechanism 14 in the above-described ship 1. Gas engine devices 21 (hereinafter, simply referred to as "engine device 21") are driven by a premixed combustion mode in which a fuel gas such as natural gas is mixed with the air and then combusted. FIG. 4 shows an intake/exhaust system in the engine device 21. FIG. 5 is a schematic diagram schematizing the inside of a cylinder head in the engine device 21. FIG. 6 is a control block diagram of the engine device 21.

As shown in FIG. 3, each engine device 21 is connected to the gas fuel tank 32 provided in the ship 1 through a vaporizing device 34 and a gas valve unit 35, and constitutes a fuel gas supply passage. The gas fuel tank 32 stores a liquefied fuel gas obtained by liquefying a fuel gas which is a gas. The vaporizing device 34 vaporizes the liquefied fuel (fuel gas) in the gas fuel tank 32 and feeds the vaporized fuel to the engine device 21 through the gas valve unit 35. It should be noted that the gas valve unit 35 has a sealing structure, and that if the fuel gas leaks from a gas pipe, the leakage of the gas can be confirmed by detecting the gas pressure within the unit, and the engine can be urgently stopped.

The engine device 21 is connected to the gas valve unit 35 through a main fuel gas passage 30 and a sub fuel gas passage 31. The main fuel gas passage 30 has a main fuel gas pressure regulator 110, and the gas pressure of the fuel gas to be supplied from the gas valve unit 35 to the engine device 21 is adjusted by the main fuel gas pressure regulator 110. The main fuel gas passage 30 has a main fuel gas pressure regulator 110, and the gas pressure of the fuel gas to be supplied from a later-described gas injector 98 (see FIG. 4) to a main chamber M (FIG. 5) is adjusted by the main fuel gas pressure regulator 110. Further, the sub fuel gas passage 31 has a sub fuel gas pressure regulator 111, and the gas pressure of the fuel gas to be supplied from a later-described check valve 89 (see FIG. 5) to a sub chamber S (FIG. 5) is adjusted by the sub fuel gas pressure regulator 111.

As shown in FIG. 4, the engine device 21 has a structure in which a plurality of gas columns 36 (6 cylinders in the present embodiment) are serially aligned in a later-described cylinder block 25. Each cylinder 36 is in communication with an intake manifold (intake passage) 67 structured in the cylinder block 25, through an intake port 37. Each cylinder 36 is in communication with an exhaust manifold (exhaust gas passage) 44 arranged above the later-described cylinder head 26, through an exhaust port 38. To the intake port 37 of each cylinder 36, a gas injector 98 is arranged.

Therefore, while the air from the intake manifold 67 is supplied to each cylinder 36 through the intake port 37, the exhaust gas from each cylinder 36 is ejected to the exhaust manifold 44 through the exhaust port 38. The fuel gas is supplied from the gas injector 98 to the intake port 37. The fuel gas is then mixed with the air from the intake manifold 67, and a premixed gas is supplied to each cylinder 36. Further, in the intake manifold 67, an intake manifold pressure sensor 39 configured to measure the air pressure in the intake manifold 67 is arranged.

It should be noted that, in the present embodiment, the amount of air in the intake manifold 67 is based on the intake manifold pressure; however, the present invention is not limited to this. For example, the flow rate of air supplied to the intake manifold 67 may be detected by a mass flow meter or an orifice meter, and the amount of the air in the intake manifold 67 may be based on the detected air flow rate.

An exhaust gas outlet side of the exhaust manifold 44 is connected to an exhaust gas inlet of a turbine 49a of a turbocharger 49 is connected. An air inlet side (fresh air inlet side) of the intake manifold 67 is connected to an air ejection port (fresh air outlet) of an intercooler 51. An air inlet port (fresh air inlet) of the intercooler 51 is connected to the air ejection port (fresh air outlet) of a compressor 49b of the turbocharger 49. Between the compressor 49b and the intercooler 51, a main throttle valve V1 is arranged. By adjusting the valve opening degree of the main throttle valve V1, the flow rate of air to be supplied to the intake manifold 67 is adjusted.

A supplied-air bypass passage 17 configured to bypass the compressor 49b connects the air inlet port side (fresh air inlet side) of the compressor 49b with the air inlet side of the intercooler 51. That is, the supplied-air bypass passage 17 is opened to the outside air on the upstream side of the air inlet port of the compressor 49b, while being connected to a connection part of the intercooler 51 to the main throttle valve V1. On this supplied-air bypass passage 17, a supplied-air bypass valve V2 is arranged. By adjusting the valve opening degree of the supplied-air bypass valve V2, the flow rate of air from the downstream side of the main throttle valve V1 into the outside air through the supplied-air bypass passage 17 is adjusted.

As described above, the intake system of the engine device 21 includes: the intake manifold 67, the intercooler 51, the main throttle valve V1, the compressor 49b, and the supplied-air bypass valve V2. In the intake system of the engine device 21, the intercooler 51, the main throttle valve V1, and the compressor 49b are arranged in this order from the intake manifold 67 towards the upstream side of the air flow. The supplied-air bypass valve V2 is provided on the supplied-air bypass passage 17 which is a bypass path that bypasses the compressor 49b. Further, the exhaust system of the engine device 21 includes the exhaust manifold 44 and the turbine 49a. The turbine 49a is arranged from the exhaust manifold 44 towards the downstream side of the flow of the exhaust gas.

As shown in FIG. 5, the engine device 21 has cylinders 36 installed in the cylinder block 25, and each cylinder 36 houses therein a piston 78 in a slidable manner. The cylinder head 26 is arranged in the upper part of the cylinder block 25, and an igniter 79 is inserted in the cylinder head 26. On the outer circumference side of the igniter 79, an intake valve 80 and an exhaust valve 81 are installed in a slidable manner. In the igniter 79, the sub chamber S is formed on the lower end side of the igniter 79. Further, in the igniter 79, a spark plug 82 and a check valve 89 are inserted so that their leading ends are positioned above the sub chamber S. In the cylinder 36, a main chamber M is formed which is surrounded by the lower side of the cylinder block 25 and the top portion of the piston 78.

That is, in the cylinder block 25, cylinder 36 having a cylindrical shape is inserted. By having the piston 78 reciprocating in the up-down directions in the cylinder 36, the engine output shaft 24 on the lower side of the cylinder 36 is rotated. On each cylinder head 26 on the cylinder block 25, the igniter 79 having the spark plug 82 and the check valve 89 is inserted with its leading end directed to the cylinder 36. This igniter 79 has its leading end in the center position of the upper end surface of the cylinder 36, and the check valve 89 is connected to the sub fuel gas passage 31. Therefore, when the engine device 21 is driven, the fuel gas injected from the check valve 89 is ignited by the spark of the spark plug 82 in the sub chamber S of the igniter 79, thereby generating an ignition flame (combustion gas) in the center position of the main chamber M in the cylinder 36.

In the intake port 37, a gas injector 98 is arranged, and the gas injection nozzle 103 of the gas injector 98 is inserted in the air passage in the intake port 37. Further, the gas injector 98 is connected to the main fuel gas passage 30. In the air passage in the intake port 37, the fuel gas injected from the gas injection nozzle 103 is mixed with the air flowing in from the intake manifold 67. Therefore, when the intake valve 80 is opened, premixed gas obtained by mixing the air from the intake manifold 67 with the fuel gas from the gas injector 98 flows into the main chamber M.

In each cylinder head 26, the intake port 37 opens and closes with up and down movement of the intake valve 80, and the exhaust port 38 opens and closes with up and down movement of the exhaust valve 81. That is, when the intake valve 80 opens, the air from the intake manifold 67 is taken into the main combustion chamber in the cylinder 36 through the intake port 37. On the other hand, when the exhaust valve 81 opens, the combustion gas (exhaust gas in the main combustion chamber in the cylinder 36 is exhausted to the exhaust manifold 44 through the exhaust port 38. Therefore, when the engine device 21 is driven, an ignition flame (combustion gas) is generated by the igniter 79, which leads to reaction of the premixed gas supplied to the main chamber M in the cylinder 36 through the intake valve 80, thus causing premixed combustion.

That is, when the engine device 21 is driven, the gas injector 98 injects the fuel gas into the intake port 37. Therefore, in the intake port 37, the fuel gas injected from the gas injector 98 is mixed with the air flowing in from the intake manifold 67. The mixed gas obtained by mixing the air with the fuel gas therefore flows towards the intake valve 80 through the intake port 37. At this time, by opening the intake valve 80, the mixed gas is taken into the main chamber M in the cylinder 36. Then, after the intake valve 80 is closed and the piston 78 is slid to compress the mixed gas in the main chamber M, an ignition flame generated by the igniter 79 is injected in the main chamber M, to combust the mixed gas in the main chamber M. After that, the exhaust valve 81 is opened to exhaust the combustion gas (exhaust gas) in the main chamber M to the exhaust manifold 44 through the exhaust port 38 in the cylinder head 26.

In the main fuel gas passage 30, a main fuel gas pressure sensor 112 and a main fuel gas temperature sensor 113 for measuring the gas pressure and the gas temperature of the combustion gas in the passage are installed. Based on a measurement result by the main fuel gas pressure sensor 112, the flow rate of the fuel gas supplied from the gas injector 98 to the intake port 37 is measured. Further, with the main fuel gas temperature sensor 113, the temperature of the fuel gas supplied from the gas injector 98 is measured. In the sub fuel gas passage 31, a sub fuel gas pressure sensor 114 for measuring the gas pressure of the fuel gas in the passage is installed. Based on a measurement result by the sub fuel gas pressure sensor 114, the flow rate of the fuel gas supplied to the check valve 89 is measured.

As shown in FIG. 6, the engine device 21 has an engine controlling device 73 configured to control each part of the engine device 21, and for each cylinder 36, the spark plug 82 and the gas injector 98 are provided. The engine controlling device 73 provides control signals to the spark plug 82 and the gas injector 98 to control ignition by the spark plug 82 and supply of fuel gas by the gas injector 98.

The engine controlling device 73 controls the main fuel gas pressure regulator 110 and the sub fuel gas pressure regulator 111 to adjust the gas pressure (gas flow rate) of the fuel gas supplied from the main fuel gas passage 30 and the sub fuel gas passage 31. The engine controlling device 73 provides control signals to the main throttle valve V1 and the supplied-air bypass valve V2 to adjust their valve opening degrees, thereby adjusting the air pressure (intake manifold pressure) in the intake manifold 67.

The engine controlling device 73 calculates the load imposed to the engine device 21, based on a measurement signal from a load measuring device (load detection sensor) 19 such as a watt transducer and a torque sensor. The engine controlling device 73 detects the engine rotation number of the engine device 21, based on a measurement signal from an engine rotation sensor 20 such as a pulse sensor configured to measure the rotation number of the crank shaft 24. The engine controlling device 73 detects the pressure based on a measurement signal from the intake manifold pressure sensor (pressure sensor) 39 configured to measure the air pressure in the intake manifold 67. The engine controlling device 73 detects the lubricating oil temperature Tj of a lubricating oil circulated in the engine device 21, based on a measurement signal from a lubricating oil temperature sensor 115.

The engine controlling device 73 receives measurement signals from the main fuel gas pressure sensor 112 which detects fuel gas pressure (main chamber gas pressure) Pm, the main fuel gas temperature sensor 113 which detects fuel gas temperature Tm, and the sub fuel gas pressure sensor 114 which detects sub fuel gas pressure (sub chamber gas pressure) Ps as a sub chamber fuel flow rate The engine controlling device 73 drives and controls the main fuel gas pressure regulator 110 based on the measurement signals from the main fuel gas pressure sensor 112 and the main fuel gas temperature sensor 113, to adjust the flow rate of the main fuel gas supplied to the gas injector 98 of each intake port 37. The engine control device 73 drives and controls the sub fuel gas pressure regulator 111 based on the measurement signal from the sub fuel gas pressure sensor 114 to adjust the flow rate of sub fuel gas supplied to the check valve 89 of each igniter 79.

The engine controlling device 73 adjusts a valve-open period of the gas injector 98 to set the flow rate of fuel gas supplied to the main chamber M of each cylinder 36. The engine controlling device 73 then controls ignition operation of the spark plug 82, to cause combustion in each cylinder 36 at a predetermined timing. That is, the gas injector 98 supplies the fuel gas to the intake port 37, at a flow rate based on the valve opening degree, mix the fuel gas with the air from the intake manifold 67, and supplies the premixed fuel to the cylinder 36. Then, at the injection timing of each cylinder 36, the sub fuel gas supplied from the check valve 89 to the sub chamber S in the igniter 79 is ignited by the spark plug 82. The combustion gas generated in this igniter 79 is injected into the main chamber M, and combusted in the cylinder 36 in which the premixed gas is supplied.

Figure 7:
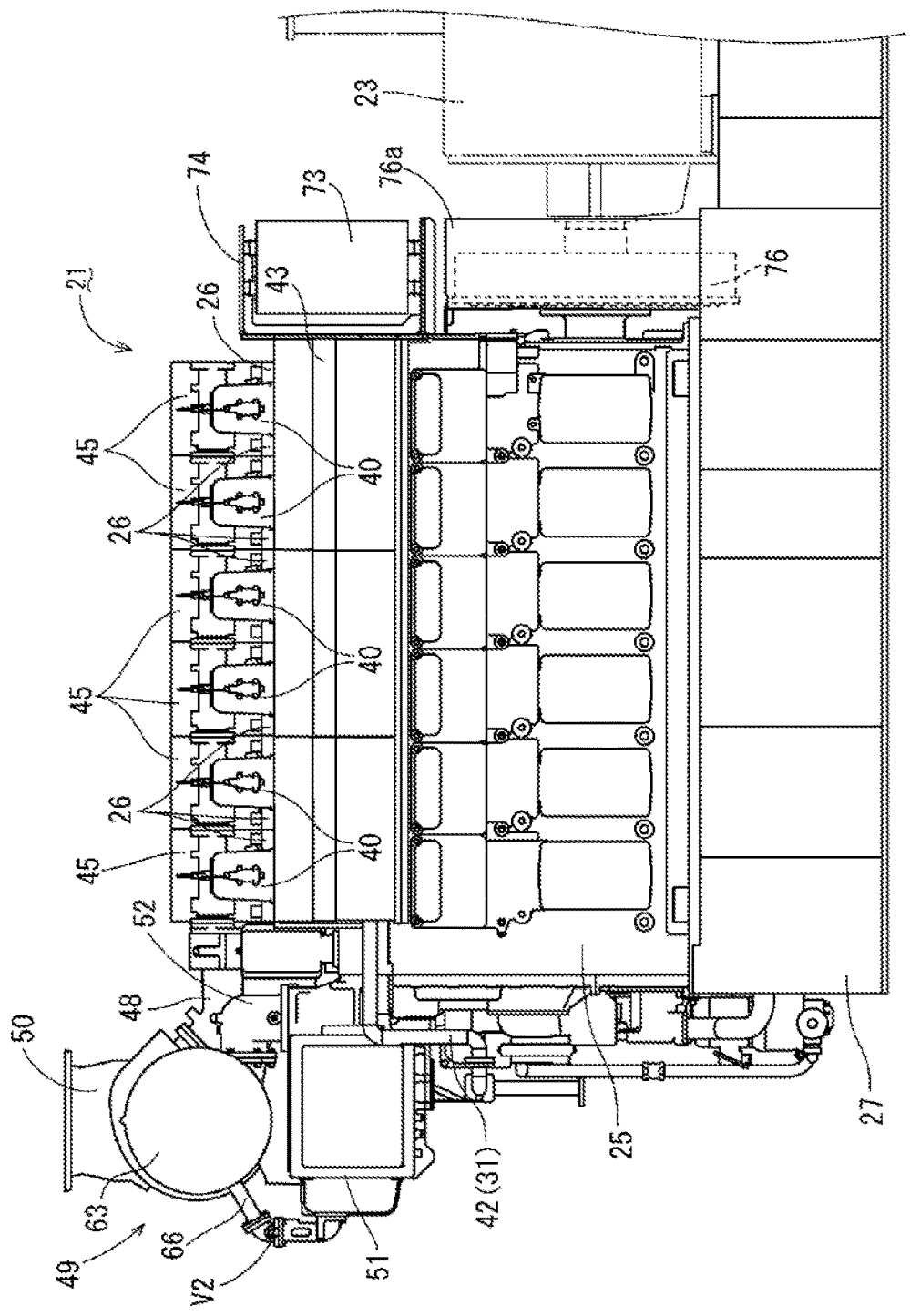
FIG. 7 A side view of the engine device.
Figure 8:
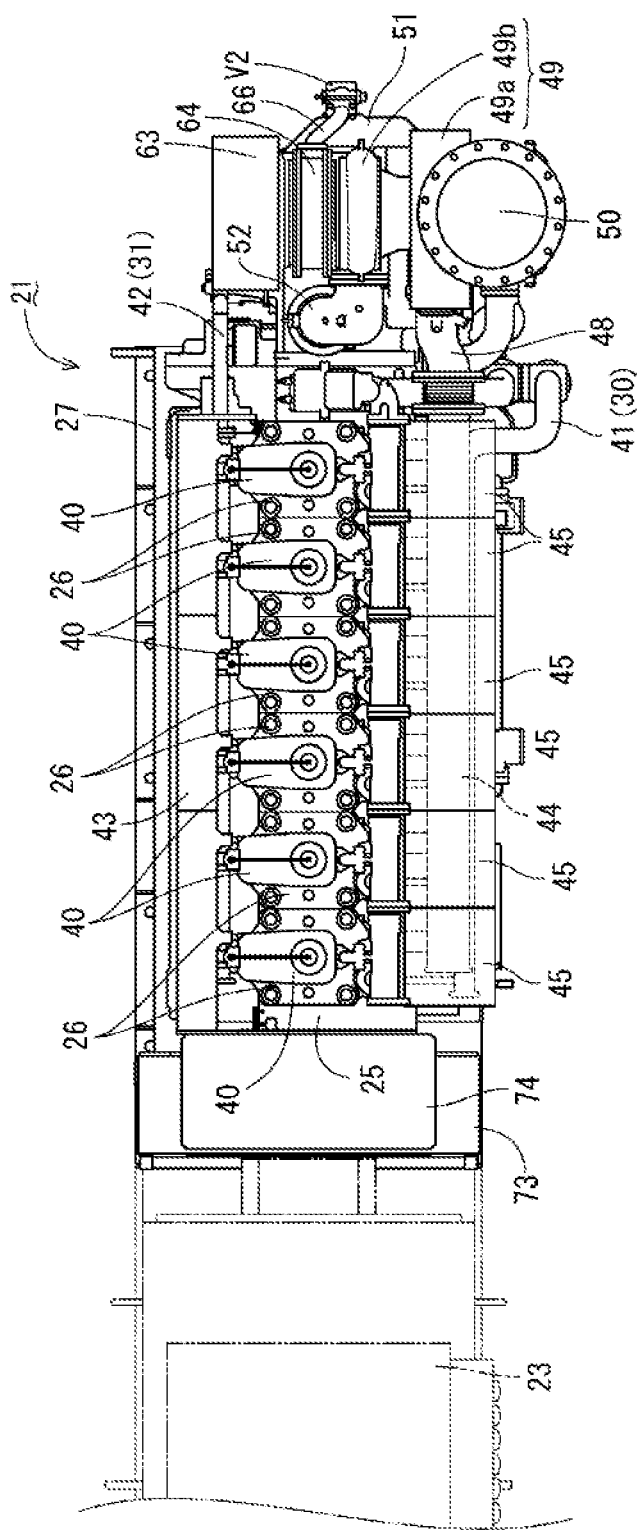
FIG. 8 A plan view of the engine device.
Figure 9:
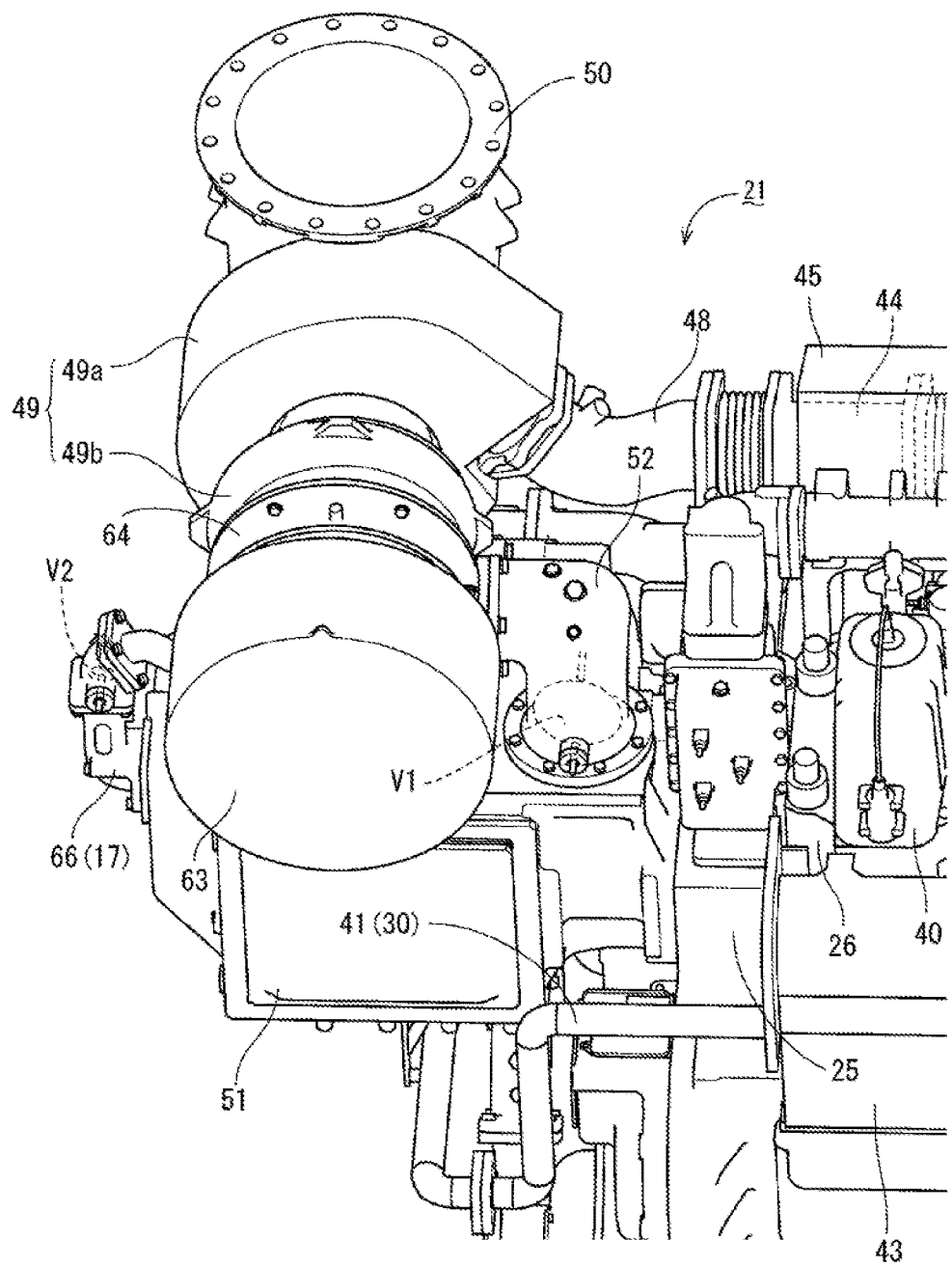
FIG. 9 An enlarged perspective view of the engine device.

Next, the following describes an exterior structure of the gas engine device 21 (engine device 21) with reference to FIG. 7 to FIG. 9. In the following description, the positional relationship of the front, rear, left, and right in the structure of the engine device 21 are designated with the side connecting to the generator 23 as the rear side.

As shown in FIG. 7 and FIG. 8, the engine device 21 has the engine output shaft 24 in the cylinder block 25 which is fixed on a base mount 27, and the cylinder heads 26 in which a plurality of head covers 40 are aligned in one array in front-rear directions are mounted on the cylinder block 25. In the engine device 21, a main fuel gas pipe 41 which is a part of the main fuel gas passage 30 extends parallel to the array of head covers 40 on the right side face of the cylinder heads 26, and a sub fuel gas pipe 42 which is a part of the sub fuel gas passage 31 extends parallel to the array of head covers 40 on the left side face of the cylinder block 25.

On the upper side of the main fuel gas pipe 41, the exhaust manifold (exhaust gas passage) 44 extends parallel to the array of the head covers 40, and the outer circumference of this exhaust manifold 44 is covered by a thermal insulation cover 45. The thermal insulation cover 45 is structured so as to cover the outer circumferential surface and the trailing end of the exhaust manifold 44. An air layer formed between this thermal insulation cover 45 and the exhaust manifold 44 functions as a thermal insulation layer, and reduces influence of exhaust heat from the exhaust manifold 44 to the surroundings. Further, on the left side face of the cylinder block 25, there is a side cover 43 arranged to cover the sub fuel gas pipe 42.

As shown in FIG. 7 to FIG. 9, the front end of the exhaust manifold 44 (exhaust gas outlet side) is connected to the turbocharger 49 through the exhaust gas relay pipe 48. Therefore, exhaust gas exhausted through the exhaust manifold 44 flows into the turbine 49a of the turbocharger 49 through the exhaust gas relay pipe 48, thus rotating the turbine 49a and rotating the compressor 49b on the same shaft as the turbine 49a. The turbocharger 49 is arranged on the upper side of the front end of the engine device 21, and has the turbine 49a on its right side, and the compressor 49b on the left side. An exhaust gas outlet pipe 50 is arranged on the right side of the turbocharger 49, and is connected to the exhaust gas outlet of the turbine 49a, to output exhaust gas from the turbine 49a.

On the lower side of the turbocharger 49, an intercooler 51 that cools down a compressed air from the compressor 49b of the turbocharger 49 is arranged. That is, on the front end side of the cylinder block 25, the intercooler 51 is installed, and the turbocharger 49 is placed in the upper part of the intercooler 51. In the laterally middle layer position of the turbocharger 49, the air ejection port of the compressor 49b is provided so as to be open rearwards (towards the cylinder block 25). On the other hand, on the top surface of the intercooler 51, an air inlet port is provided which opens upward, and through this air inlet port, compressed air ejected from the compressor 49b flows into the intercooler 51. The air ejection port of the compressor 49b and the air inlet port of the intercooler 51 are in communication with each other through a supplied-air relay pipe 52 two which one ends of the ports are connected. In the supplied-air relay pipe 52, the main throttle valve V1 is pivotally supported.

The turbocharger 49 pivotally supports, on the same shaft, the compressor 49b and the turbine 49a arranged on the left and right. Based on rotation of the turbine 49a introduced from the exhaust manifold 44 through the exhaust gas relay pipe 48, the compressor 49b is rotated. Further, the turbocharger 49 has, on the left side of the compressor 49b serving as fresh air intake side, an intake filter 63 which removes dust from outside air introduced and a fresh air passage pipe 64 connecting the intake filter 63 and the compressor 49b. By having the compressor 49b rotate in sync with the turbine 49a, the outside air (air) taken in to the intake filter 63 is introduced into the compressor 49b through the turbocharger 49. The compressor 49b then compresses the air taken in from the left side and ejects the compressed air to the supplied-air relay pipe 52 installed on the rear side.

The supplied-air relay pipe 52 has its upper front portion opened and connected to the ejection port on the rear of the compressor 49b, and has its lower side opened and connected to the inlet port on the top surface of the intercooler 51. Further, at a branching port provided on an air passage on the front surface of the intercooler 51, one end of a supplied-air bypass pipe 66 (supplied-air bypass passage 17) is connected, and a part of compressed air cooled by the intercooler 51 is ejected to the supplied-air bypass pipe 66. Further, the other end of the supplied-air bypass pipe 66 is connected to a branching port provided on the front surface of the fresh air passage pipe 64, and a part of the compressed air cooled by the intercooler 51 is circulated to the fresh air passage pipe 64 through the supplied-air bypass pipe 66, and merges with the outside air from the intake filter 63. Further, the supplied-air bypass pipe 66 pivotally supports, on its midway portion, the supplied-air bypass valve V2.

In the intercooler 51, compressed air from the compressor 49b flows in from the left rear side through the supplied-air relay pipe 52, and the compressed air is cooled through a heat exchanging action with cooling water supplied from water-supply pipe 62. The compressed air cooled on a left chamber inside the intercooler 51 flows in the air passage on the front and is introduced into a right chamber, and then ejected to the intake manifold 67 (see FIG. 4) through an ejection port provided on the rear of the right chamber.

Further, the turbine 49a of the turbocharger 49 connects the inlet port at the rear with the exhaust gas relay pipe 48, and connects the ejection port on the right side with the exhaust gas outlet pipe 50. This way, in the turbocharger 49, exhaust gas is introduced to the inside of the turbine 49a from the exhaust manifold 44 through the exhaust gas relay pipe 48, thus rotating the turbine 49a as well as the compressor 49b, and is exhausted from the exhaust gas outlet pipe 50. The exhaust gas relay pipe 48 has its rear side opened and connected with the ejection port of the exhaust manifold 44, while having its front side opened and connected to the inlet port on the rear side of the turbine 49a.

Further, the engine controlling device 73 configured to control operations of each part of the engine device 21 is fixed on the trailing end surface of the cylinder block 25 through a supporting stay (support member 74). On the rear end side of the cylinder block 25, there is installed a flywheel 76 connected to the generator 23 to rotate, and the engine control device 73 is arranged in an upper part of a flywheel housing 76a covering the flywheel 76. The engine control device 73 is electrically connected to sensors (a pressure sensor and a temperature sensor) in each part of the engine device 21 to collect temperature data, pressure data, and the like of each part of the engine device 21, and provides electromagnetic signals to an electromagnetic valve and the like of each part of the engine device 21 to control various operations (plug ignition, gas pressure adjustment, valve opening degree adjustment, gas injection, cooling water temperature adjustment, and the like) of the engine device 21.

As described above, in the engine device 21 of the present embodiment, the main throttle valve V1 is provided at the connecting portion between the air outlet of the turbocharger 49 and the inlet of the intercooler 51. Further, the engine device 21 has a supplied-air bypass pipe 66 connecting the air flow inlet port of the turbocharger 49 and the inlet of the intercooler 51, and the supplied-air bypass valve V2 is arranged in the supplied-air bypass pipe 66. With the structure including the main throttle valve V1 and the supplied-air bypass valve V2, the air flow rate of the intake manifold 67 can be controlled with high accuracy, and hence the air flow rate can be controlled with good responsiveness with respect to load fluctuations. Since the supplied-air bypass pipe 66 functions as a buffer passage for the compressor 49b and the intake manifold 67 of the turbocharger 49, controlling the opening degree of the supplied-air bypass valve V2 enable increasing the response speed for setting the air flow rate suitable with an increase and decrease in the load.

When the engine load is increased, the engine controlling device 73 executes opening degree control of the supplied-air bypass valve V2 to set the flow rate of air supplied to the intake manifold 67. By executing bypass valve control when the load is high, the flow rate of air passing the main throttle valve V1 is suitably controlled, and therefore insufficient flow rate of air supplied to the intake manifold 67 is prevented. Since the air flow rate can be controlled with a good responsiveness with respect to a rapid increase in the load, it is possible to achieve a suitable air-fuel ratio, which stabilizes the operation of the engine device 21.

When the engine load is decreased, the engine controlling device 73 executes the opening degree control of the supplied-air bypass valve V2 to set the flow rate of air supplied to the intake manifold 67. In cases of control only with the main throttle valve V1 when the load is low, the air flow rate is rapidly reduced on the outlet side of the compressor 49b of the turbocharger 49, leading to surging in which the air in the compressor 49b is reversed. However, by controlling the supplied-air bypass valve V2 at the same time, the air pressure in the inlet and outlet of the compressor 49*b* is stabilized, and the surging therefore can be prevented.

Further, in the engine device 21 of the present embodiment, the engine controlling device 73 executes the opening degree control of the main throttle valve V1, when the engine load is in a low load range. On the other hand, when the engine load is in the middle/high load range, the engine controlling device 73 sets the main throttle valve V1 to a predetermined opening degree, and executes the opening degree control of the supplied-air bypass valve V2. Since a bypass valve control with good responsiveness is executed in the middle/high load range where the influence from the load fluctuation is significant, excess or shortage of the air flow rate with respect to the load fluctuation is restrained, and the engine device 21 can be smoothly operated.

Figure 10:
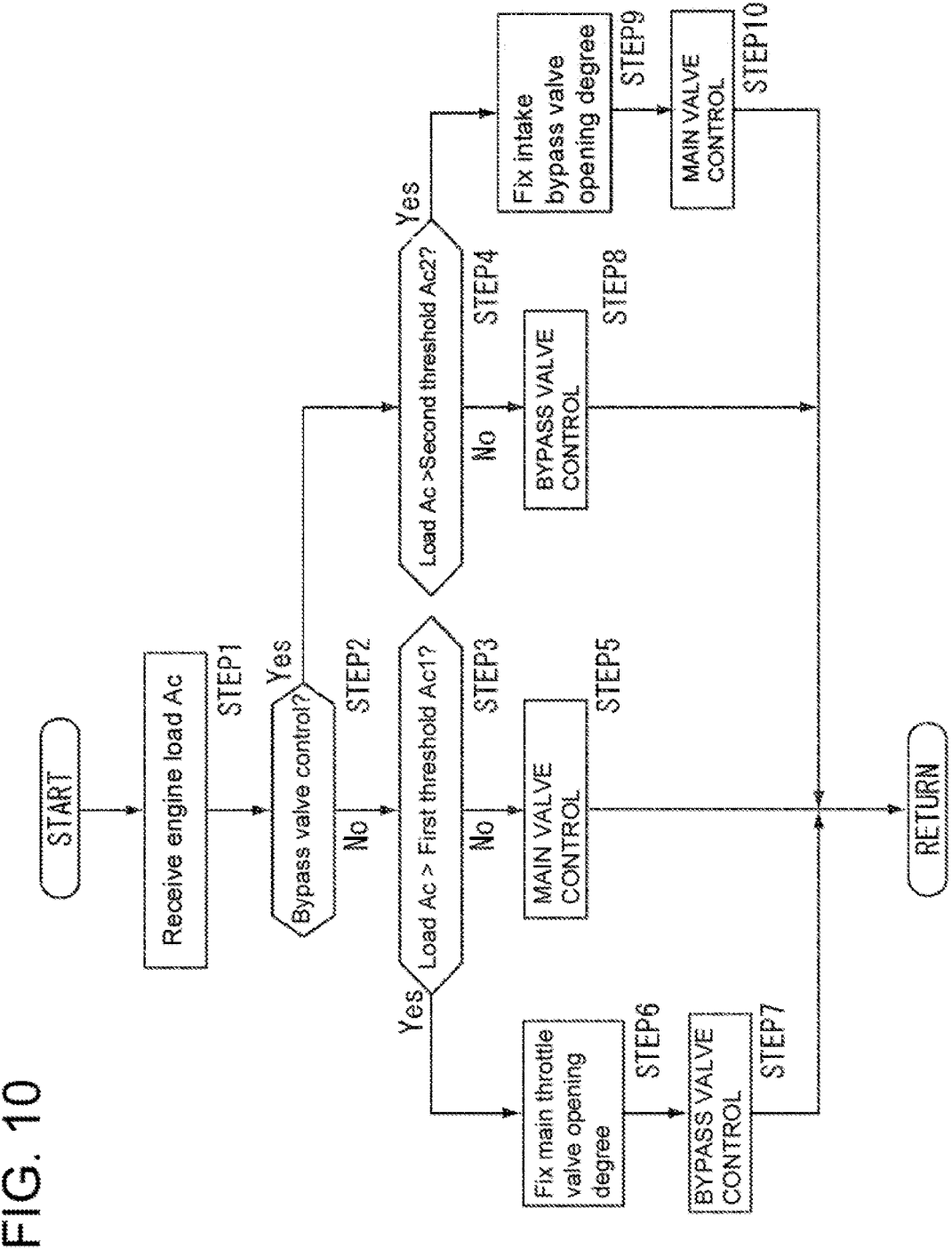
FIG. 10 A flowchart showing operations in an air flow rate control of the engine device.

As shown in the flowchart of FIG. 10, when a measurement signal from the load measuring device (load detection sensor) 19 is received (STEP 1), the engine control device 73 confirms whether or not the opening degree control of the supplied-air bypass valve V2 (bypass valve control) is executed (STEP 2). When the bypass valve control is not executed (No in STEP 2), the engine control device 73 compares the engine load Ac with a predetermined load (first threshold) Ac1 (STEP 3), based on the measurement signal received in STEP 1. On the other hand, when the bypass valve control is not executed (Yes in STEP 2), the engine control device 73 compares the engine load Ac with a predetermined load (second threshold value) Ac2 ($0<Ac2<Ac1$) (STEP 4), based on the measurement signal received in STEP 1.

When the engine load Ac is not more than the predetermined load Ac1 (No) in STEP 3, the engine controlling device 73 determines that the engine load Ac is in the low load range, and performs feedback control (PID control) with respect to the valve opening degree of the main throttle valve V1 (STEP 5). At this time, the engine controlling device 73 sets a target value (target pressure) of the intake manifold pressure according to the engine load. Then, the engine controlling device 73 receives a measurement signal from the pressure sensor 39 and confirms the measured value (measured pressure) of the intake manifold pressure to obtain the difference from the target pressure. This way, based on the difference value between the target pressure and the measured pressure, the engine controlling device 73 executes the PID control of the valve opening degree of the main throttle valve V1 to bring the air pressure of the intake manifold 67 close to the target pressure. Hereinafter, the opening degree control of the main throttle valve V1 is referred to as "main valve control".

On the other hand, when the engine load Ac is more than the predetermined engine load Ac1 (Yes) in STEP 3, the engine controlling device 73 determines that the engine load Ac is in the middle/high load range, and fixes the valve opening degree of the main throttle valve V1 to a predetermined opening degree (STEP 6). Then, the engine controlling device 73 performs the feedback control (PID control) with respect to the valve opening degree of the supplied-air bypass valve V2 (STEP 7). At this time, the engine controlling device 73 receives a measurement signal from the pressure sensor 39, and executes the PID control of the valve opening degree of the supplied-air bypass valve V2 based on the difference value between the target pressure and the measured pressure, to bring the air pressure of the intake manifold 67 to the target pressure, as in the case of the main valve control.

That is, when the engine load Ac is increasing and exceeds the predetermined load Ac1, the engine controlling device 73 switches the main valve control to the bypass valve control as pressure control for the intake manifold pressure. In the present embodiment, when the load increases and exceeds the predetermined load Ac1, the engine controlling device 73 fully opens the main throttle valve V1 and controls the air flow rate in the supplied-air bypass passage 17 through the opening degree control of the supplied-air bypass valve V2 thereby adjusting the intake manifold pressure. Since a bypass valve control with good responsiveness is executed in the middle/high load range where the influence from the load fluctuation is significant, excess or shortage of the air flow rate with respect to the load fluctuation is restrained, and a suitable air-fuel ratio can be set.

When the engine load Ac is not less than the predetermined load Ac2 (No) in STEP 4, the engine controlling device 73 determines that the engine load Ac is in the middle/high load range, and continues the feedback control (bypass valve control) with respect to the valve opening degree of the supplied-air bypass valve V2 (STEP 8). On the other hand, when the engine load Ac is below the predetermined engine load Ac2 (Yes) in STEP 4, the engine controlling device 73 determines that the engine load Ac is in the low load range, and fixes the valve opening degree of the supplied-air bypass valve V2 to a predetermined opening degree (STEP 9). Then, the engine controlling device 73 performs the feedback control (main valve control) with respect to the valve opening degree of the main throttle valve V1 (STEP 10).

That is, when the engine load Ac is dropping and falls short of the predetermined load Ac2 which is higher than the predetermined load Ac1, the engine control device 73 switches the main valve control to the bypass valve control as pressure control for the intake manifold pressure. As described, regarding the switching of the pressure control of the intake manifold pressure, the switching operation can be smoothly executed by giving hysteresis to threshold values for the time of load increasing and the time of load decreasing.

Figure 11:
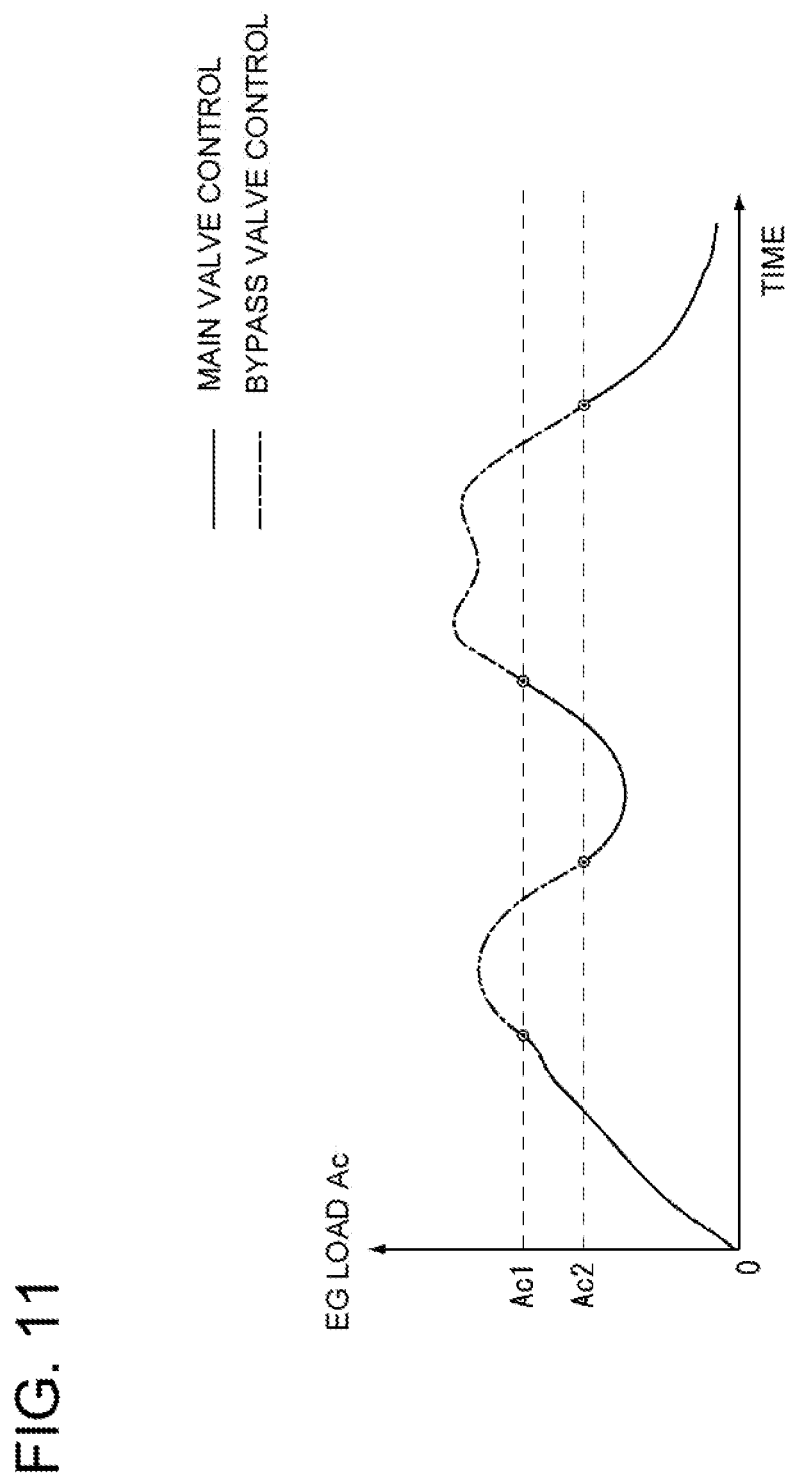
FIG. 11 A time chart showing operations in the air flow rate control of the engine device.

As shown in FIG. 11, in the engine device 21 of the present embodiment, when the engine load Ac increases, the engine controlling device 73 executes the opening degree control for the main throttle valve V1 while the engine load Ac is lower than the first threshold Ac1, and switches from the opening degree control for the main throttle valve V1 to the opening degree control for the supplied-air bypass valve V2, when the engine load Ac exceeds the first threshold Ac1. On the other hand, when the second Ac decreases, the engine controlling device 73 executes the opening degree control for the supplied-air bypass valve V2 while the engine load Ac is not less than the second threshold Ac2 which is lower than the first threshold value Ac1, and switches from the opening degree control for the supplied-air bypass valve V2 to the opening degree control for the main throttle valve V1, when the engine load Ac falls short of the second threshold Ac2.

With the structure including the main throttle valve V1 and the supplied-air bypass valve V2, the air flow rate of the intake manifold 67 can be controlled with high accuracy, and hence the air flow rate can be controlled with good responsiveness with respect to load fluctuations. Since a bypass valve control with good responsiveness is executed in the high load range where the influence from the load fluctuation is significant, excess or shortage of the air flow rate with respect to the load fluctuation is made small, thus enabling stable operation. Further, by providing hysteresis in the threshold value for control switching, switching of control can be smoothly executed.

Figure 12:
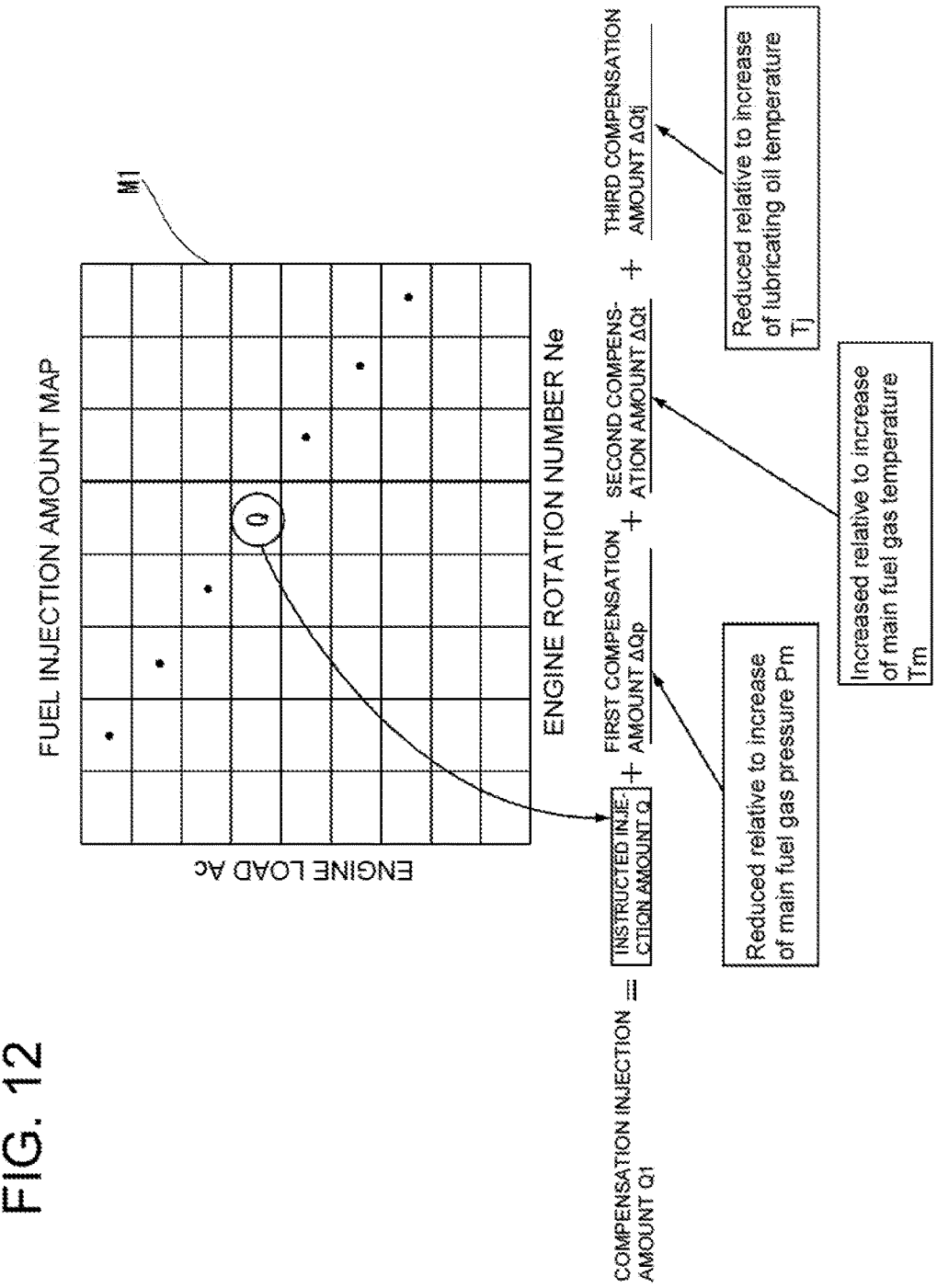
FIG. 12 A schematic diagram showing operations in a fuel gas injection amount control.

Next, the following describes a fuel injection amount (main fuel gas injection amount) control by the engine controlling device 73. As shown in FIG. 12, the engine controlling device 73 stores a fuel injection amount map M1, and based on the fuel injection amount map M1, the main fuel gas flow rate by the gas injector 98 is determined. The fuel injection amount map M1 indicates the correlation between the engine rotation number Ne, the engine load Ac and an instructed fuel injection amount Q as the fuel flow rate, and is for determining the instructed fuel injection amount Q for the engine rotation number Ne and the engine load Ac.

Upon receiving the engine load Ac measured by the load measuring device (load detection sensor) 19 and the engine rotation number Ne measured by the engine rotation sensor 20, the engine controlling device 73 refers to the fuel injection amount map M1, and determines the instructed fuel injection amount Q. Then, for the instructed fuel injection amount Q determined, the engine controlling device 73 executes a compensation calculation to calculate a compensation injection amount Q1, by using a first compensation amount $\Delta$Qp by a main fuel gas pressure Pm, a second compensation amount $\Delta$Qt by a main fuel gas temperature Tm, or a third compensation amount $\Delta$Qtj by the lubricating oil temperature Tj Thus, flow rate control is performed so that the main fuel gas flow rate from the gas injector 98 is the compensation injection amount Q1 determined by the engine controlling device 73.

In the engine device 21, an increase in the main fuel gas pressure Pm increases the density of the main fuel gas, and reduces the fuel injection amount required to handle the same engine load Ac with a predetermined engine rotation number Ne. Therefore, when the main fuel gas pressure Pm measured by the main fuel gas pressure sensor 112 is received, the engine control device 73 calculates compensation injection amount Q1 with the instructed fuel injection amount Q reduced by the first compensation amount $\Delta$Qp which is made proportional to an increase in the main fuel gas pressure Pm, in the compensation calculation for calculating the compensation injection amount Q1. That is, the first compensation amount $\Delta$Qp is a compensation amount which decreases in proportion to an increase in the main fuel gas pressure Pm.

In the engine device 21, an increase in the main fuel temperature Tm lowers the density of the main fuel gas, and increases the fuel injection amount required to handle the same engine load Ac with a predetermined engine rotation number Ne. Therefore, when the main fuel gas temperature Tm measured by the main fuel gas temperature sensor 113 is received, the engine control device 73 calculates compensation injection amount Q1 with the instructed fuel injection amount Q increased by the second compensation amount $\Delta$Qt which is made proportional to an increase in the main fuel gas temperature Tm, in the compensation calculation for calculating the compensation injection amount Q1. That is, the second compensation amount $\Delta$Qt is a compensation amount which decreases in proportion to an increase in the main fuel gas temperature Tm.

In the engine device 21, an increase in the lubricating oil temperature Tj lowers the density of the lubricating oil, and reduces the fuel injection amount required to handle the same engine load Ac with a predetermined engine rotation number Ne. Therefore, when the lubricating oil temperature Tj measured by the lubricating oil temperature sensor 115 is received, the engine control device 73 calculates compensation injection amount Q1 with the instructed fuel injection amount Q reduced by the third compensation amount $\Delta$Qtj which is made proportional to an increase in the lubricating oil temperature Tj, in the compensation calculation for calculating the compensation injection amount Q1. That is, the third compensation amount $\Delta$Qtj is a compensation amount which decreases in proportion to an increase in the lubricating oil temperature Tj.

The engine controlling device 73 sets a target value (target pressure) Pim of the intake manifold pressure according to the engine load, when executing the above-described main valve control or the bypass valve control. At this time, the engine controlling device 73 determines a target pressure Pim, with reference to a target intake manifold pressure map M2. The target intake manifold pressure map M2 indicates the correlation between the engine rotation number Ne and the engine load Ac, and is for determining the target pressure Pim with respect to the engine rotation number Ne and the engine load Ac.

Figure 13:
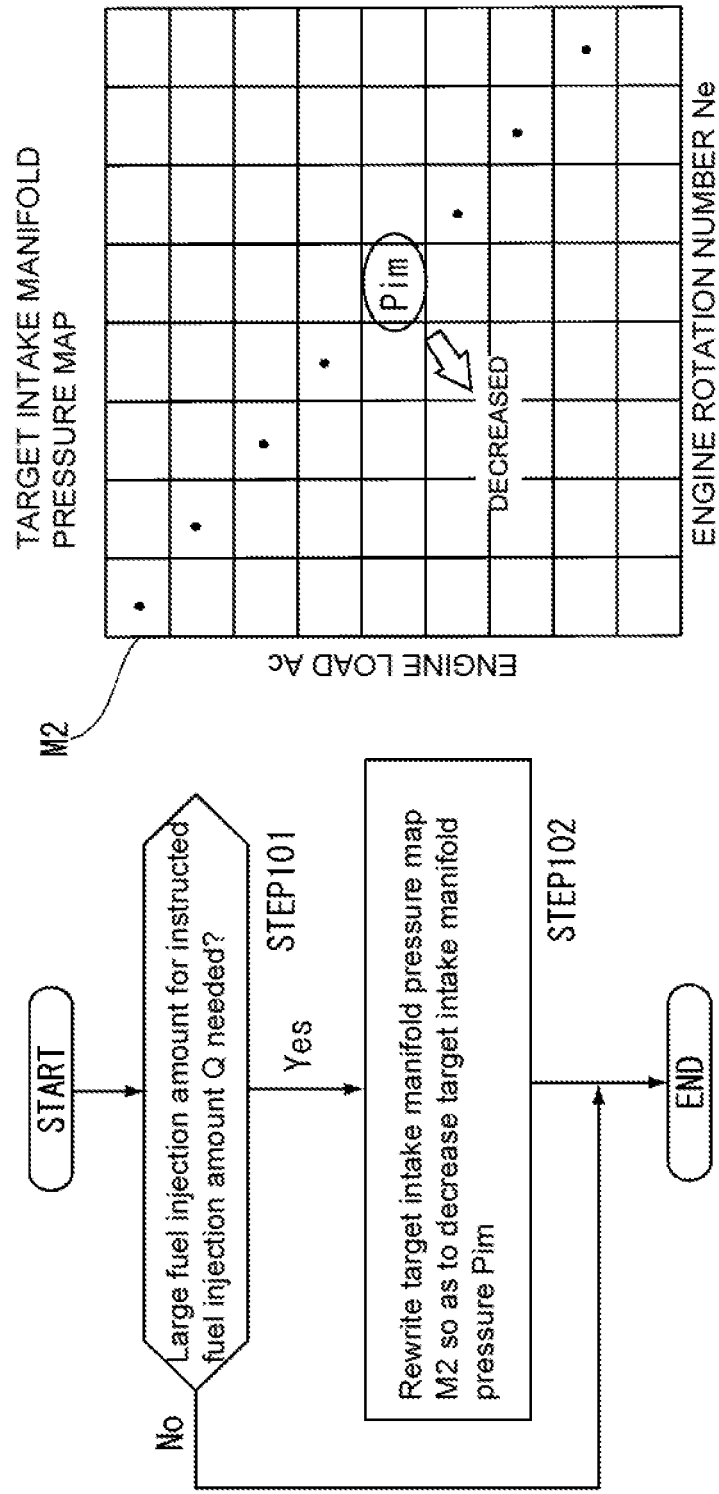
FIG. 13 A flowchart showing operations in a target intake manifold pressure map correction control.

Further, as shown in FIG. 13, the engine controlling device 73 rewrites the stored contents of the target intake manifold pressure map M2 when a fuel injection amount equal to or larger than the determined fuel injection amount is required. That is, based on the engine load Ac measured by the load measuring device 19 and the engine rotation number Ne measured by the engine rotation sensor 20, the engine controlling device 73 determines whether or not the fuel injection amount from the gas injector 98 is insufficient (STEP 101). When the fuel injection amount from the gas injector 98 is determined as to be insufficient (Yes in STEP 101), the engine controlling device 73 performs correction (rewriting) so that the target pressure Pim in the target intake manifold pressure map M2 is made small and stores the same (STEP 102).

A case where the fuel injection amount from the gas injector 98 needs to be larger than the set fuel injection amount is, for example, when the set fuel injection amount falls short for achieving a target engine rotation number Ne with respect to the engine load Ac; or a case requiring a fuel injection amount larger than the fuel injection amount Q calculated based on the fuel injection amount map, at a predetermined engine rotation number Ne and a predetermined engine load Ac.

In such a case, the stored element of the target intake manifold pressure map M2 is rewritten so that the target pressure Pim in the target intake manifold pressure map M2 is smaller. Therefore, even when the fuel injection amount is insufficient, an air-fuel ratio at which a required combustion effect is obtained can be achieved by lowering the intake manifold pressure at a predetermined engine rotation number Ne and a predetermined engine load Ac. In other words, when a fuel gas having different composition is supplied to the engine device 21, the quantity of heat generated with the fuel gas with the different composition is low, which necessitates a larger fuel injection amount than usual. At this time, by performing correction so that the target pressure Pim is smaller, a suitable excess air ratio can be achieved, and deterioration in the fuel consumption can be prevented.

Figure 14:
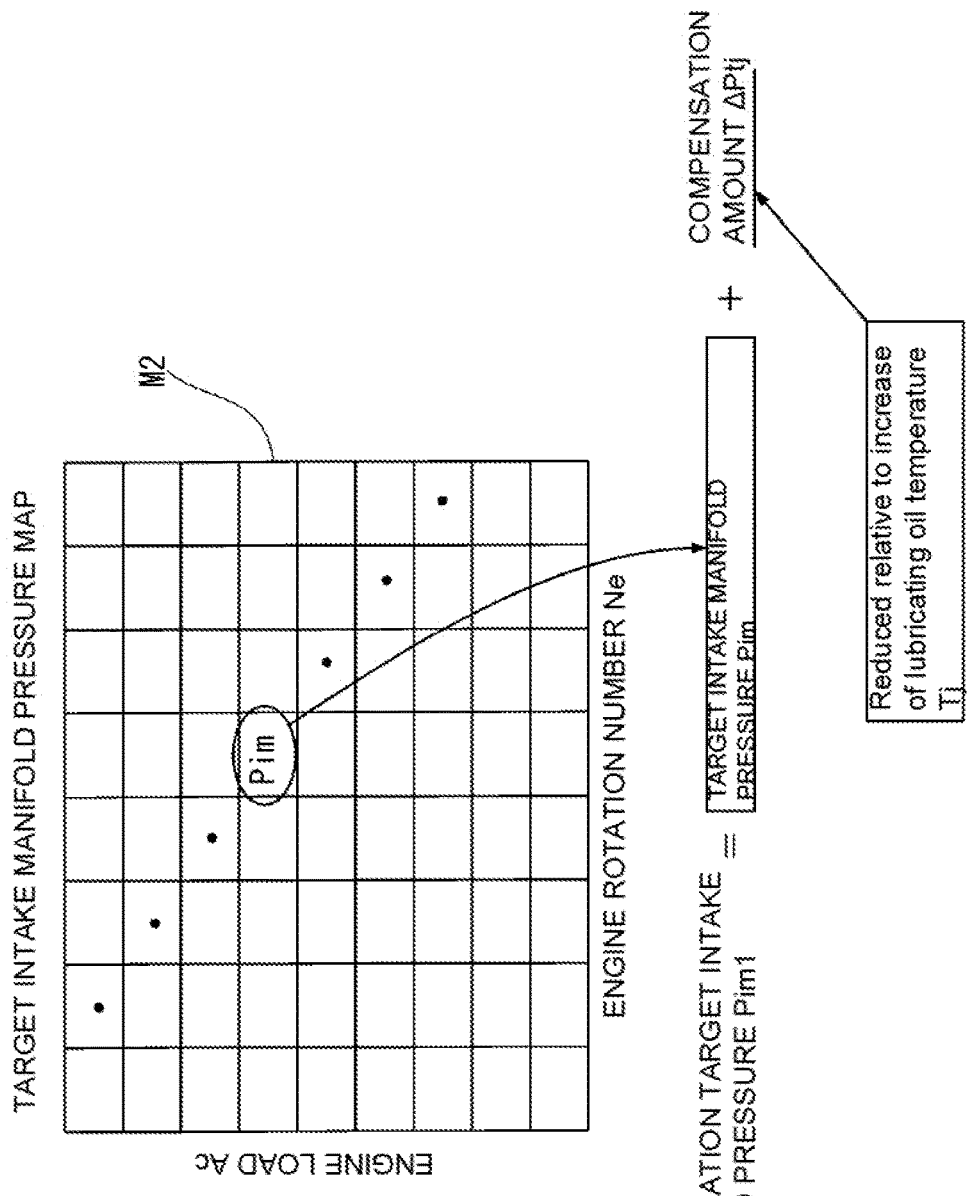
FIG. 14 A schematic diagram showing operations in a target intake manifold pressure map correction control.

Further, as shown in FIG. 14, the engine controlling device 73 calculates compensated target pressure Pim1, by executing a compensation calculation to calculate the target pressure Pim determined based on the target intake manifold pressure map M2 with a compensation amount $\Delta$Ptj based on the lubricating oil temperature Tj. Thus, the engine controlling device 73 executes PID control with respect to the valve opening degree of the main throttle valve V1 or the supplied-air bypass valve V2, based on the difference between the measured pressure from the pressure sensor 39 and the compensated target pressure Pim1.

When the lubricating oil temperature Tj rises, the engine device 21 shifts the excess air ratio to the rich side during a cold state (a state in which the lubricating oil temperature Tj is lowered). This makes the combustion unstable, inhibiting the speed-governing control, and the engine may be stalled. Therefore, when the lubricating oil temperature Tj measured by the lubricating oil temperature sensor 115 is received, the engine control device 73 calculates compensated target pressure Pim1 with the target pressure Pim increased by the compensation amount ΔPtj which is made proportional to a decrease in the lubricating oil temperature Tj, in the compensation calculation for calculating the compensated target pressure Pim1. By executing the pressure control for the intake manifold 67 based on the compensated target pressure Pim1, a suitable excess air ratio is maintained even during the cold state.

The engine controlling device 73 sets a target value (target pressure) Pim of the intake manifold pressure according to the engine load, when executing the above-described main valve control or the bypass valve control. At this time, the engine controlling device 73 determines a target pressure Pim, with reference to a target intake manifold pressure map M2. The target intake manifold pressure map M2 indicates the correlation between the engine rotation number Ne and the engine load Ac, and is for determining the target pressure Pim with respect to the engine rotation number Ne and the engine load Ac.

Figure 15:
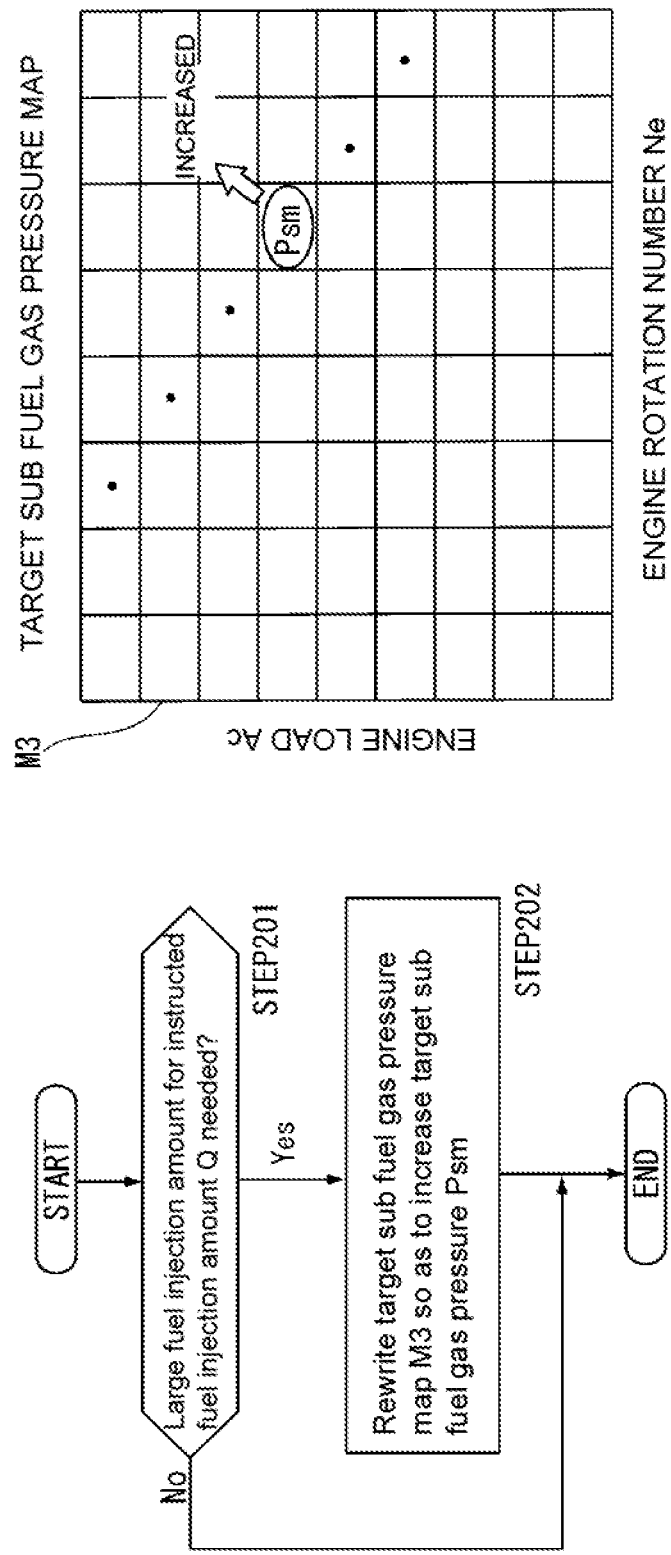
FIG. 15 A flowchart showing operations in a target sub fuel gas pressure map correction control.

As shown in FIG. 15, when the engine load Ac measured by the load measuring device 19 and the engine rotation number Ne measured by the engine rotation sensor 20 are received, the engine controlling device 73 determines a target sub fuel gas pressure Psm with reference to a target sub fuel gas pressure map M3. The target sub fuel gas pressure map M3 indicates the correlation between the engine rotation number Ne and the engine load Ac and the target sub fuel gas pressure Psm, and is for determining the target sub fuel gas pressure Psm with respect to the engine rotation number Ne and the engine load Ac.

Further, as shown in FIG. 15, the engine controlling device 73 rewrites the stored contents of the target sub fuel gas pressure map M3 when a fuel injection amount equal to or larger than the determined fuel injection amount is required. That is, as in the case of the STEP 101 in FIG. 13, based on the engine load Ac measured by the load measuring device 19 and the engine rotation number Ne measured by the engine rotation sensor 20, the engine controlling device 73 determines whether or not the fuel injection amount from the check valve 89 is insufficient (STEP 201). When the fuel injection amount from the check valve 89 is determined as to be insufficient (Yes in STEP 201), the engine controlling device 73 performs correction (rewriting) so that the target sub fuel gas pressure Psm in the target sub fuel gas pressure map M3 is made larger and stores the same (STEP 202).

When the fuel injection amount from the check valve 89 is determined as to be insufficient, the engine controlling device 73 performs correction so as to increase the target sub fuel gas pressure Psm. In other words, when a fuel gas having different composition is supplied to the engine controlling device 73, the quantity of heat generated with the fuel gas with the different composition is low, which necessitates a larger fuel injection amount than usual. At this time, by performing correction so that the target sub fuel gas pressure Psm is larger, a suitable air-fuel ratio can be achieved, and deterioration in the fuel consumption can be prevented.

Figure 16:
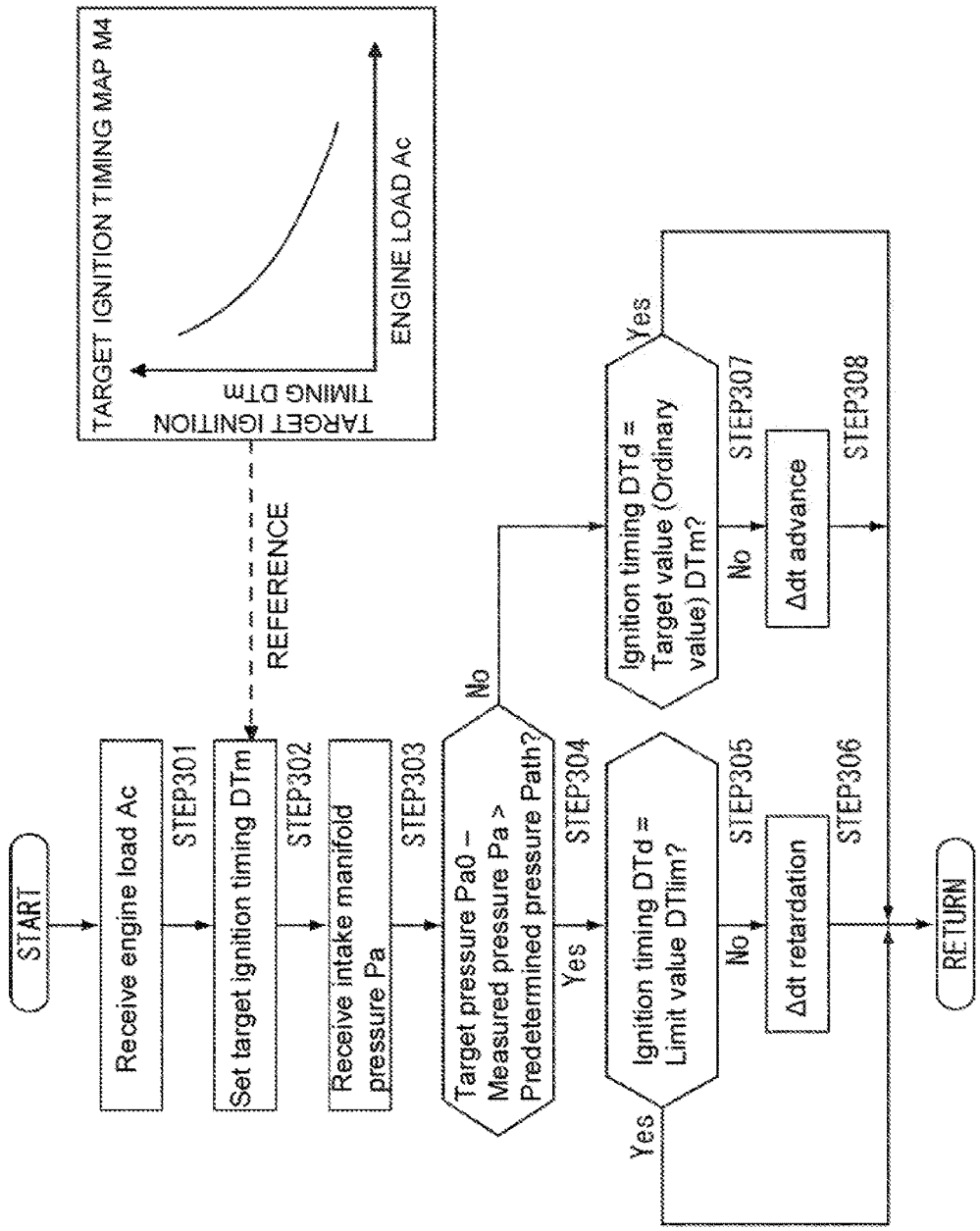
FIG. 16 A flowchart showing operations in a setting control of ignition timing by an engine controlling device.

As shown in FIG. 16, when the engine load (generator output or engine torque) Ac measured by the load measuring device 19 is received, the engine controlling device 73 determines a target ignition timing (ordinary ignition timing) for the spark plug 82, with reference to target ignition timing map M4. The target ignition timing map M4 indicates the correlation between the engine load AC and the target ignition timing DTm, and is for determining the target ignition timing DTm with respect to the engine load Ac. Further, the engine controlling device 73 performs in multiple steps a retard control of ignition timing, when the air amount is determined as to be insufficient in the premixed fuel obtained by pre-mixing the gaseous fuel with the air, and performs in multiple steps an advance control of ignition timing, when the air amount is determined as to be sufficient.

The following details the setting control of the ignition timing by the engine controlling device 73, with reference to flowchart of FIG. 16. When the engine load Ac measured by the load measuring device 19 is received (STEP 301), the engine controlling device 73 determines and stores the target ignition timing DTm with reference to the target ignition timing map M4 (STEP 302). After the target ignition timing DTm is determined, the engine controlling device 73 obtains a value Pa (measured pressure) of the intake manifold pressure measured by the intake manifold pressure sensor 39 (STEP 303). Then, the engine controlling device 73 determines whether or not the air amount is insufficient based on a difference (Pa0−Pa) between the target value Pa0 (target pressure) of the intake manifold pressure set in the valve control operation based on the flowchart of FIG. 10 and the value Pa (measured pressure) of the intake manifold pressure (STEP 304).

If the difference (Pa0−Pa) between the target pressure Pa0 and the measured pressure Pa is higher than a predetermined pressure difference Path (Yes in STEP 304), the engine controlling device 73 determines that the air amount is insufficient, and makes a transition to the retard control of STEP 305 and thereafter. On the other hand, if the difference (Pa0−Pa) between the target pressure Pa0 and the measured pressure Pa is equal to or less than the predetermined pressure difference Path (No in STEP 304), the amount of air is determined as to be sufficient, and a transition occurs to the advance control of STEP 307 and thereafter.

After transition to the retard control, the engine controlling device 73 first confirms whether or not the set ignition timing DTd is an ignition timing (limit ignition timing) DTlim to become a retard limit value (STEP 305). When the ignition timing DTd has not yet reached the limit ignition timing DTlim (No in STEP 305), the ignition timing DTd is retarded by a predetermined amount Δdt (e.g. 1°) (STEP 306). That is, when the retard limit value is reached during the retard control, the engine controlling device 73 stops the retard control.

Figure 17:
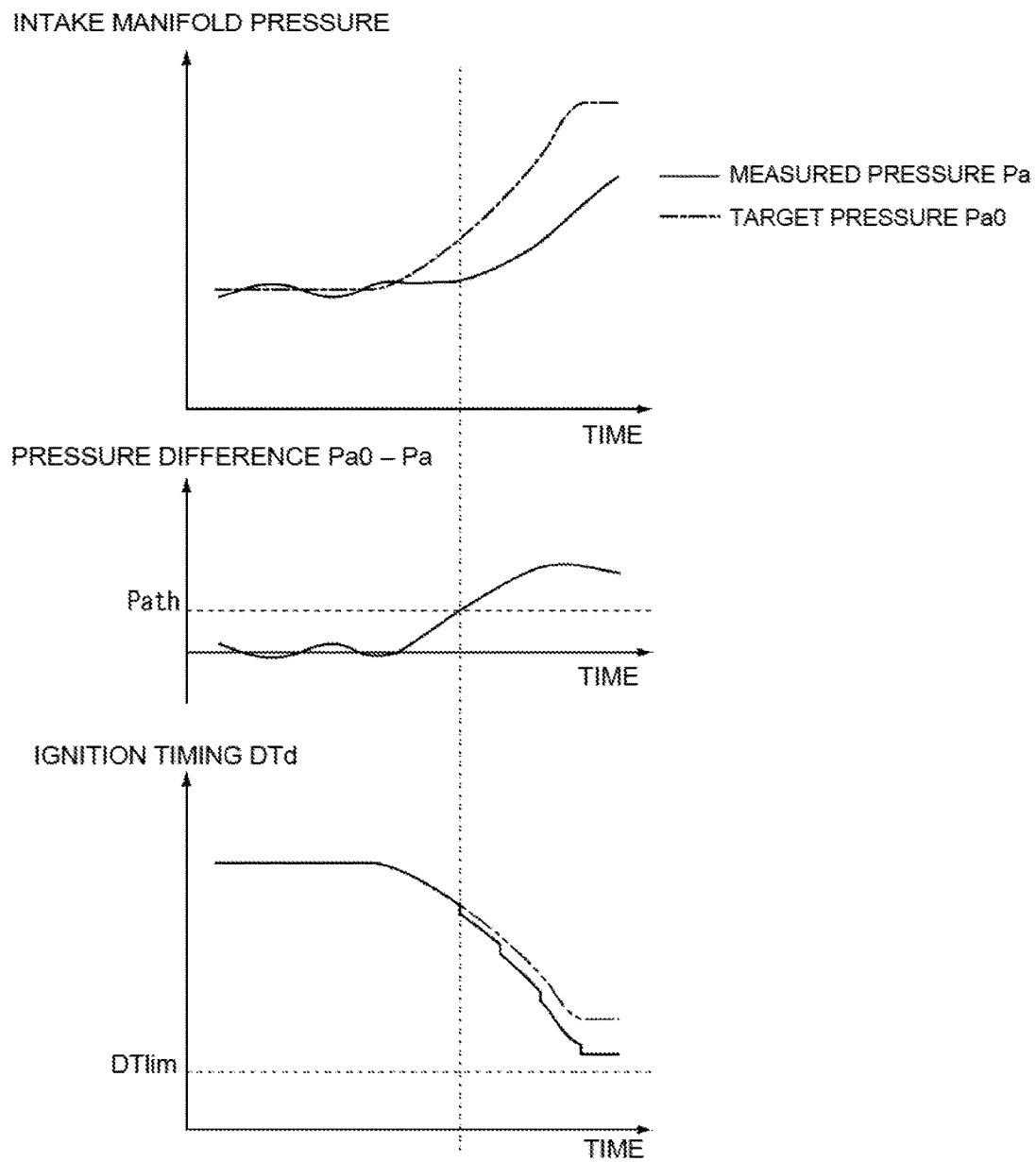
FIG. 17 A time chart of the control.

With this retard control by the engine controlling device 73, the ignition timing DTd can be retarded in multiple steps until it reaches the limit ignition timing DTlim, when the amount of air is estimated to be insufficient based on a difference between the target pressure Pa0 and the measured pressure Pa as shown in FIG. 17. Accordingly, the ignition timing DTd can be retarded in such a way that the probability of knocking occurring based on fluctuation in the output can be lowered. Further, since the range of the retardation can be limited, deterioration in the thermal efficiency (engine output efficiency) based on the retardation of the ignition timing can be suppressed to the minimum.

After transition to the advance control, the engine controlling device 73 first confirms whether or not the set ignition timing DTd is the target ignition timing DTm (STEP 307). When the ignition timing DTd has not yet reached the target ignition timing DTm (No in STEP 305), the ignition timing DTd is advanced by a predetermined amount Mt (STEP 308). That is, when the ignition timing DTd becomes the one during the ordinary driving, through the advance control, the engine controlling device 73 stops the advance control.

With this advance control by the engine controlling device 73, the ignition timing DTd can be advanced in multiple steps until it reaches the target ignition timing DTm of the ordinary driving, when the amount of air is estimated to be insufficient based on a difference between the target pressure Pa0 and the measured pressure Pa. Since the ignition timing DTd is advanced to improve the thermal efficiency, assuming the output is stabilized, and the ignition timing DTd is gradually changed, the probability of knocking taking place can be restrained even when the output fluctuates again.

Figure 18:
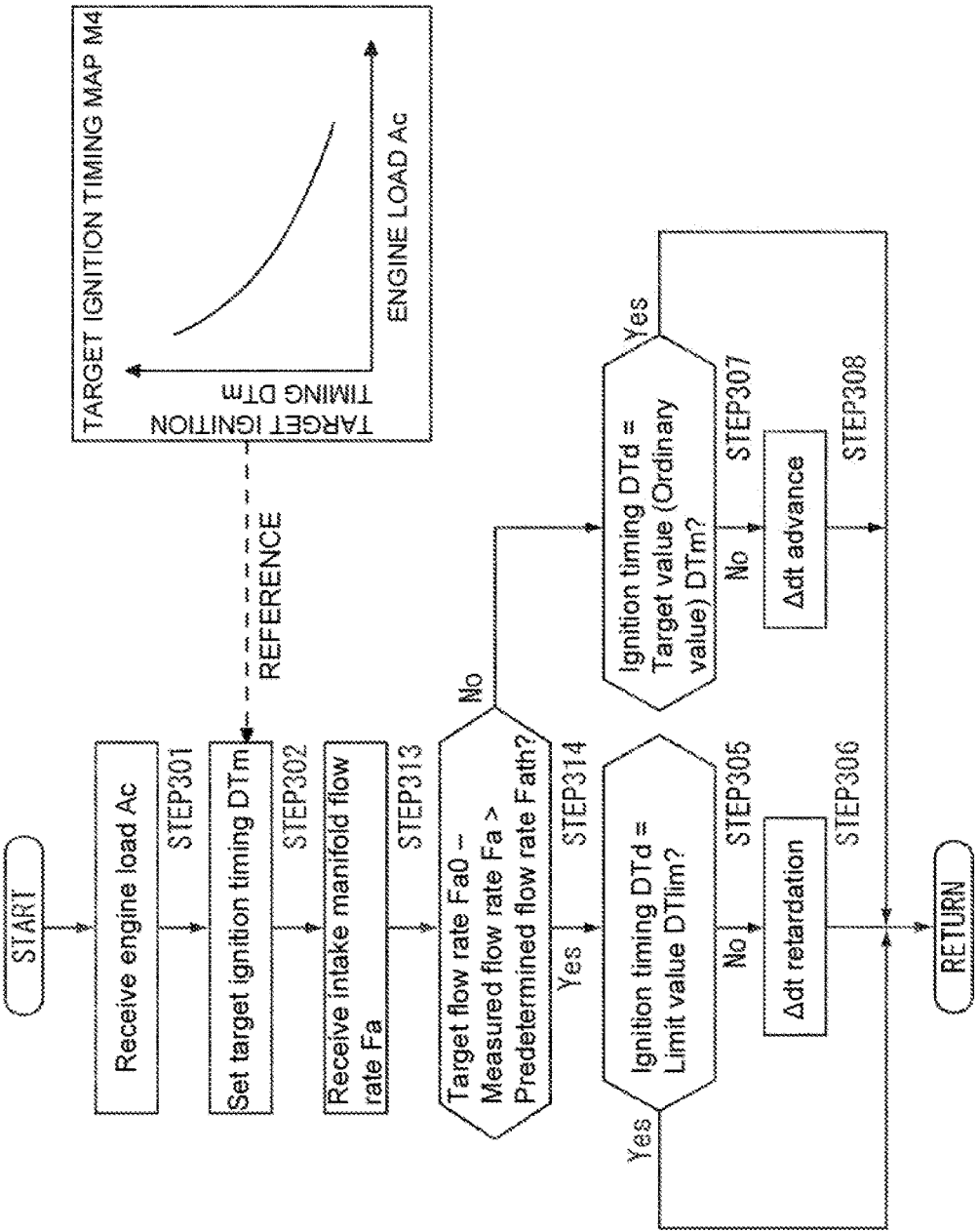
FIG. 18 A flowchart showing a first modification of the setting control of ignition timing by an engine controlling device.

It should be noted that, in the above setting control of the ignition timing, the surplus and shortage of the amount of air is confirmed based on the difference between the target pressure Pa0 and the measured pressure Pa; however, the surplus and shortage of the air amount may be confirmed based on a different parameter. The following describes a first modification of the setting control of the ignition timing by the engine controlling device 73, with reference to the flowchart of FIG. 18. It should be noted that, in the flowchart of FIG. 18, operation steps identical to those in the flowchart of FIG. 16 refer to the above-description, and detail description for those steps are omitted.

In the present modification, the engine controlling device 73 refers to the target ignition timing map M4 to determine the target ignition timing DTm based on the engine load Ac (STEP 301 to STEP 302), and then receives the measured value Fa (measured flow rate) of the air flow rate (intake manifold flow rate) in the intake manifold 67 from a flow rate sensor (not shown) (STEP 313). Then, the engine controlling device 73 determines whether or not the air amount is insufficient based on a difference (Fa0−Fa) between the target value Fa0 (target flow rate) of the intake manifold flow rate set based on the engine load Ac and the like and the measured value Fa (measured flow rate) of the intake manifold flow rate (STEP 314).

If the difference (Fa0−Pa) between the target flow rate Fa0 and the measured flow rate Fa is higher than a predetermined flow rate difference Path (Yes in STEP 314), the engine controlling device 73 determines that the air amount is insufficient, and makes a transition to the retard control of STEP 305 and thereafter. On the other hand, if the difference (Fa0−Pa) between the target flow rate Fa0 and the measured flow rate Fa is equal to or less than the predetermined flow rate difference Fath (No in STEP 314), the amount of air is determined as to be sufficient, and a transition occurs to the advance control of STEP 307 and thereafter.

Figure 19:
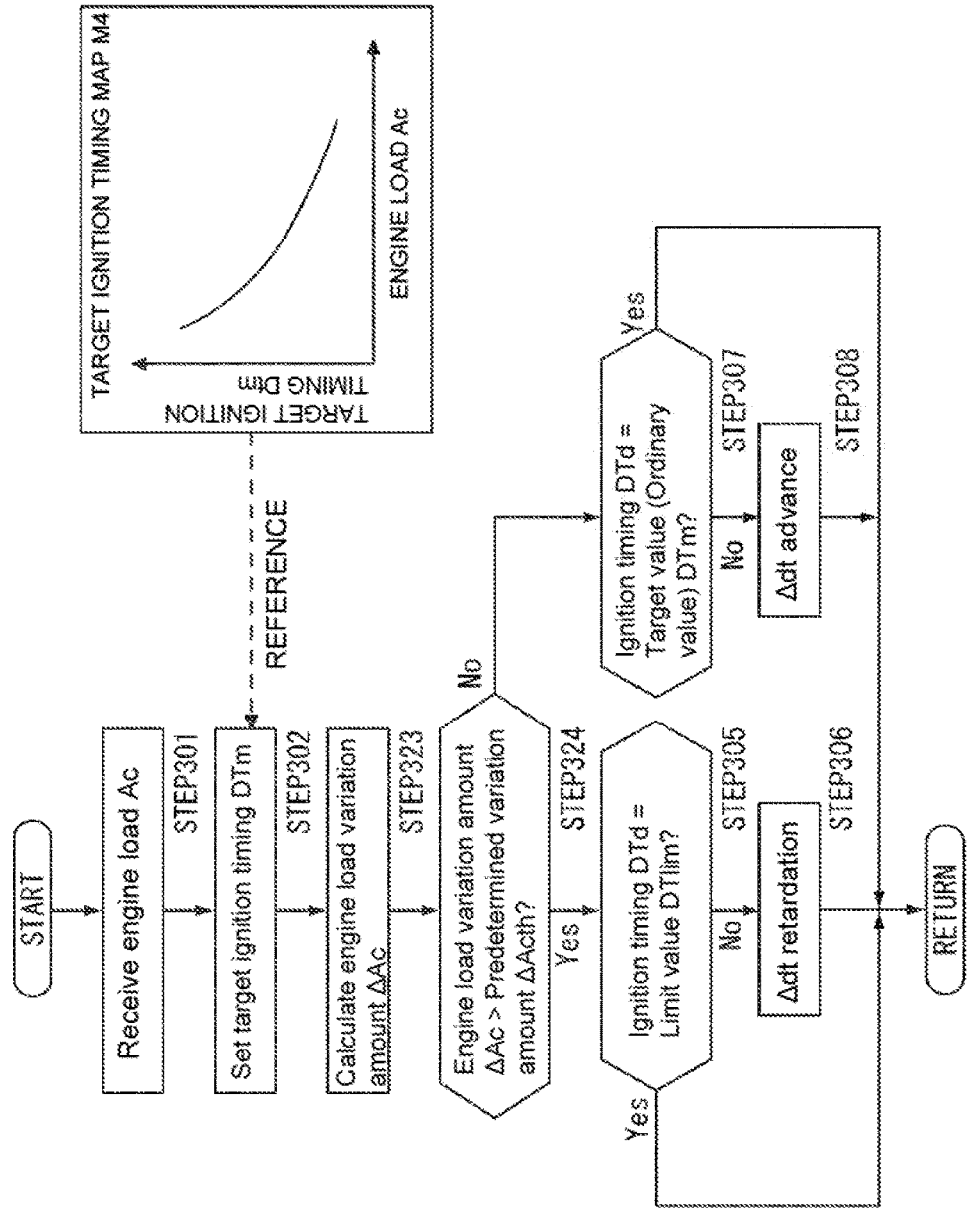
FIG. 19 A flowchart showing a second modification of the setting control of ignition timing by an engine controlling device.

The following details a second modification of the setting control of the ignition timing by the engine controlling device 73, with reference to flowchart of FIG. 19. It should be noted that, in the flowchart of FIG. 19, operation steps identical to those in the flowchart of FIG. 16 refer to the above-description, and detail description for those steps are omitted.

In the present modification, the engine controlling device 73 refers to the target ignition timing map M4 to determine the target ignition timing based on the engine load Ac (STEP 301 to STEP 302), and then calculates a variation amount of the engine load Ac (output variation amount) ΔAc (STEP 323). At this time, for example, the output variation amount ΔAc may be calculated based on a difference from the previously measured engine load Ac. Then, the engine controlling device 73 determines whether or not the air amount is insufficient based on the output variation amount ΔAc (STEP 324).

When the output variation amount ΔAc is greater than a predetermined variation amount ΔActh (Yes in STEP 324), the engine controlling device 73 determines that the air amount is insufficient, and makes a transition to the retard control of STEP 305 and thereafter. On the other hand, when the output variation amount ΔAc is equal to or less than the predetermined variation amount ΔActh (No in STEP 324), the amount of air is determined as to be sufficient, and a transition occurs to the advance control of STEP 307 and thereafter.

Figure 20:
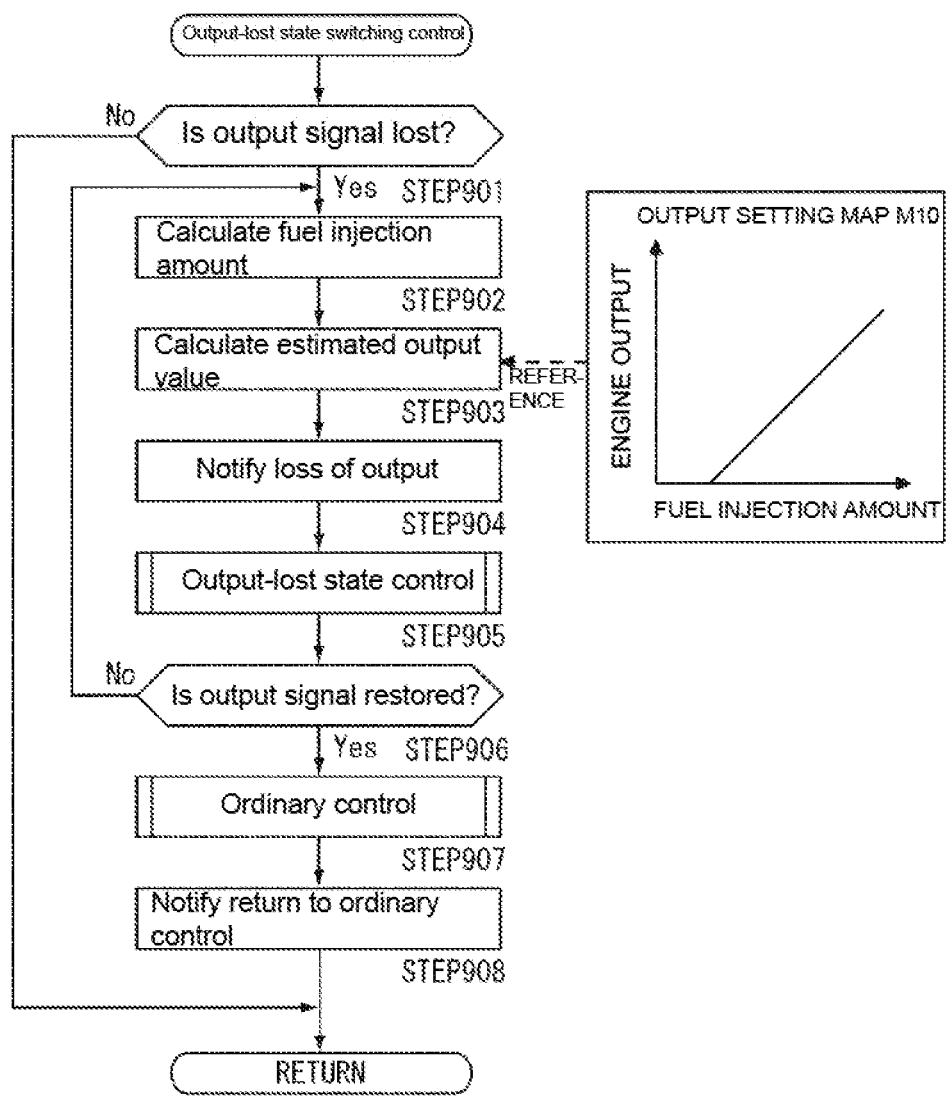
FIG. 20 A flowchart showing operations in an output-lost state switching control by an engine controlling device.

As shown in FIG. 20, when the measurement signal (output signal) from the load measuring device 19 is lost, the engine controlling device 73 executes an output-lost state switching control to temporarily execute an output-lost state control. As shown in the flowchart of FIG. 20, the engine controlling device 73 detects whether or not there is an output signal from the load measuring device 19 (STEP 901). That is, for example, when the output signal from the load measuring device 19 is not received for a predetermined period or longer due to failure in the load measuring device 19 or disconnection of a signal line with the load measuring device 19, the engine controlling device 73 determines that the output signal from the load measuring device 19 is lost.

When the signal from the load measuring device 19 is determined as to be lost (Yes in STEP 901), the engine controlling device 73, in order to sustain operation of the engine device 21 in an output-lost state, calculates a fuel injection amount (fuel gas injection amount) Qs from the following equation (1), based on a valve open period Tiq of the gas injector 98, an engine rotation number Rq, a fuel gas pressure Pq, and a fuel temperature Teq (STEP 902). It should be noted that "K1" to "K3" in the following equation (1) are constants.

$$Qs=K1 \times Tiq \times Rq \times (1+Pq/K2)/(1+Teq/K3) \tag{1}$$

Next, the engine controlling device 73 refers to an output setting map M10 to estimate the engine load As, based on the fuel injection amount Qs calculated in STEP 902 (STEP 903). That is, as a substitute for the lost output signal from the load measuring device 19, the engine controlling device 73 calculates an estimated value (estimated output signal) of the engine load As. It should be noted that the output setting map M10 shows a mutual relation between the fuel injection amount Qs and the engine load As, and the engine load As is monotonously increased with an increase in the fuel injection amount Qs.

Then, for example, the loss of the output signal from the load measuring device 19 (output-lost state) is notified through an alarming buzzer or an alarm indication device (STEP 904), the engine controlling device 73 executes a temporary control operation for a time of output-loss, by using the estimated output signal calculated in STEP 903 (STEP 905).

Through this temporary control for the time of output-loss, a target value for the intake manifold pressure (target intake manifold pressure), a target value for the fuel gas pressure in the sub chamber (target sub chamber gas pressure), the target value for the gas pressure in the main chamber (target main chamber gas pressure), and the like are set based on the estimated output signal calculated in STEP 904, and the combustion control of the engine device 21 is continued. In the present embodiment, for example, a control operation is executed using the estimated output signal calculated in STEP 904, in the main valve control and a bypass valve control (see flowchart of FIG. 10), a setting control for a target fuel injection amount (see FIG. 11), a setting control for a target intake manifold pressure (see FIG. 13 and FIG. 14), and the like.

After the control operation for the time of output-loss is executed, the engine controlling device 73 confirms whether or not there is a signal from the load measuring device 19 (STEP 906). If no signal from the load measuring device 19 is received (No in STEP 906), the engine controlling device 73 proceeds to STEP 902, and executes each operation for the time of output-loss (STEP 902 to STEP 905). On the other hand, when a signal is received from the load measuring device 19 (Yes in STEP 906), the engine controlling device 73 returns from the emergency control for the time of output-loss in STEP 905 to the ordinary control based on the output signal from the load measuring device 19 (STEP 907), and notifies the returning to the ordinary control (STEP 908).

As described, when the output signal from the load measuring device 19 (e.g., output from the generator 23, or an engine torque of the engine device 21) is lost (output-lost state), the engine controlling device 73 estimates an output signal based on a fuel gas injection amount from the gas injector 98, and executes combustion control for the premixed fuel, based on the output signal estimated (estimated output signal). At this time, to bring the engine output to the target output, the engine controlling device 73 sets target values for the intake manifold pressure and the fuel gas injection amount based on the output signal, and executes the combustion control for the premixed fuel. Since the combustion control can be executed based on the estimated output signal, an emergency stop of the engine device 21 at the time of output-loss can be prevented. Therefore, in cases of an engine device 21 for a ship for example, since an output from the engine device 21 can be ensured even in an emergency situation of losing an output signal, propulsion means for sustaining navigation of the ship can be ensured, and a risk of getting lost and the like can be prevented.

It should be noted that the above-described switching control executes the temporary control after the output signal from the load measuring device 19 is lost, until the output signal is restored (recovered), based on the engine load estimated by referring to the output setting map M10; however, the control may stop the engine device 21, in cooperation with an auxiliary engine. That is, as in the structure shown in FIG. 3, in a system having a plurality of electric power generating mechanisms 14, if an engine device 21 of an electric power generating mechanism 14 serving as a main engine is in the output-lost state, another engine device 21 of another electric power generating mechanism 14 to serve as an auxiliary engine is operated in place of the main engine. In this case, when the engine device 21 of the main engine (hereinafter, main engine device 21) enters the output-lost state, the main engine device 21 executes the temporary control for the time of output-loss, until the engine device 21 of the auxiliary engine (hereinafter, auxiliary engine device 21) is stabilized.

Figure 21:
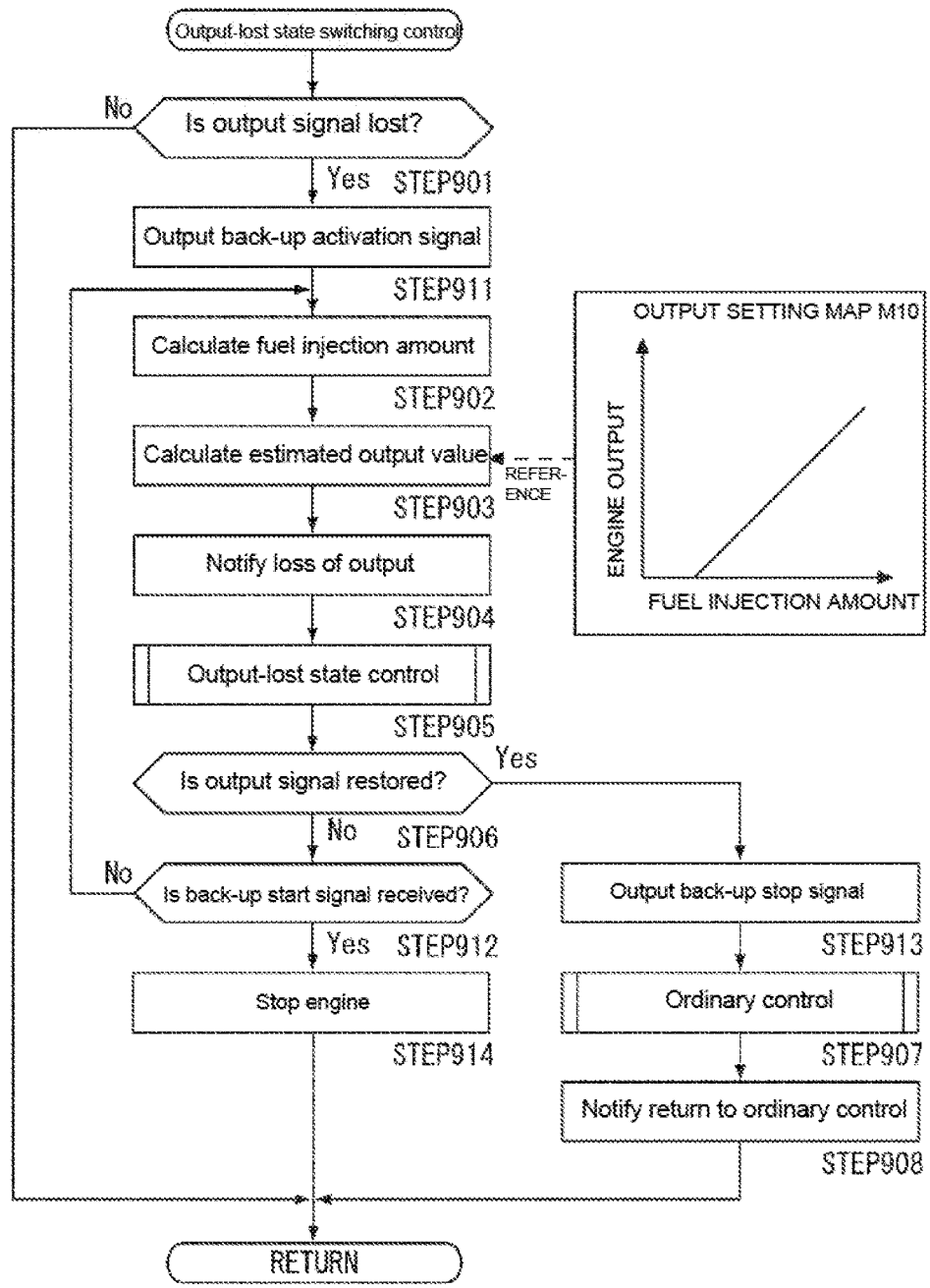
FIG. 21 A flowchart showing operations in an output-lost state switching control by an engine controlling device.

The following describes a modification of the switching control to the temporary control by the engine controlling device 73 at the time of output-loss, with reference to the flowchart of FIG. 21. It should be noted that, in the flowchart of FIG. 21, operation steps identical to those in the flowchart of FIG. 20 refer to the above-description, and detail description for those steps are omitted.

As shown in FIG. 21, in the present modification, when the output signal from the load measuring device 19 is lost (Yes in STEP 901), the engine controlling device 73 of the main engine device 21 serving as the main engine recognizes the state as an abnormal state due to loss of the output, and transmits a back-up activation signal to start the auxiliary engine device 21 in the auxiliary engine, so that the system is operable even in the abnormal state (STEP 911). Then, the engine controlling device 73, after calculating the fuel injection amount (fuel gas injection amount) Qs, refers to the output setting map M10 to estimate the engine load As, and executes the control operation for the time of output-loss (STEP 902 to STEP 905).

If no output signal from the load measuring device 19 is confirmed after the control operation for the time of output-loss is executed (No in STEP 906), the engine controlling device 73 confirms whether or not a back-up start signal is received from the engine controlling device 73 of the auxiliary engine device 21, which signal indicates that the operation of the auxiliary engine device 21 is stabilized (STEP 912). If no back-up start signal from the auxiliary engine device 21 is received (No in STEP 912), the process goes to STEP 902, and each operation for the time of output-loss is executed (STEP 902 to STEP 905). On the other hand, when the back-up start signal from the auxiliary engine device 21 is received (Yes in STEP 912), the engine controlling device 73 stops the main engine device 21 by stopping the fuel gas supply and the like (STEP 914).

When the output signal from the load measuring device 19 is restored (recovered) after the execution of the control operation for the time of output-loss (Yes in STEP 906), the engine controlling device 73 outputs a back-up stop signal to the engine controlling device 73 of the auxiliary engine device 21 so as to stop the operation of the auxiliary engine device 21 (STEP 913). Then, the engine controlling device 73 returns from the emergency control for the time of output-loss to the ordinary control, and notifies the returning to the ordinary control (STEP 907 to STEP 908).

As described, when the output signal from the load measuring device 19 is lost (output-lost state), the engine controlling device 73 estimates an output signal based on a fuel gas injection amount from the gas injector 98, and executes combustion control for the premixed fuel, based on the estimated output signal, until the operation of the auxiliary engine device 21 is started. This way, the engine device 21 whose output has been lost can be operated temporarily until a transition to the operation of the auxiliary engine 21. Therefore, even when the engine device 21 is in the output-lost state, the ship or the generator having the engine device 21 will not be stopped. Therefore, even when the output signal of the engine device 21 is lost, an emergency stop can be avoided and transition to the operation of the auxiliary engine device 21 can be reliably made. Therefore, navigation of the ship having such an engine device 21 or output of the generator having the engine device 21 can be safely sustained.

In the present embodiment, the advance amount and retard amount are set to be constant amount of $\Delta t$ and varied in multiple steps, as in the setting control of the above-described ignition timing. However, for example, a retard amount of the ignition timing based on the parameter amount for determining the surplus or shortage of the air amount may be stored in advance. The following describes setting of the ignition timing based on the retardation setting map, in an engine device of another embodiment (second embodiment), with reference to FIG. 22 to FIG. 29. It should be noted that the second embodiment deals with an example where the engine device is a dual-fuel engine capable of using premixed combustion mode using a gaseous fuel (fuel gas) and a diffusion combustion mode using a liquid fuel (fuel oil).

Figure 22:
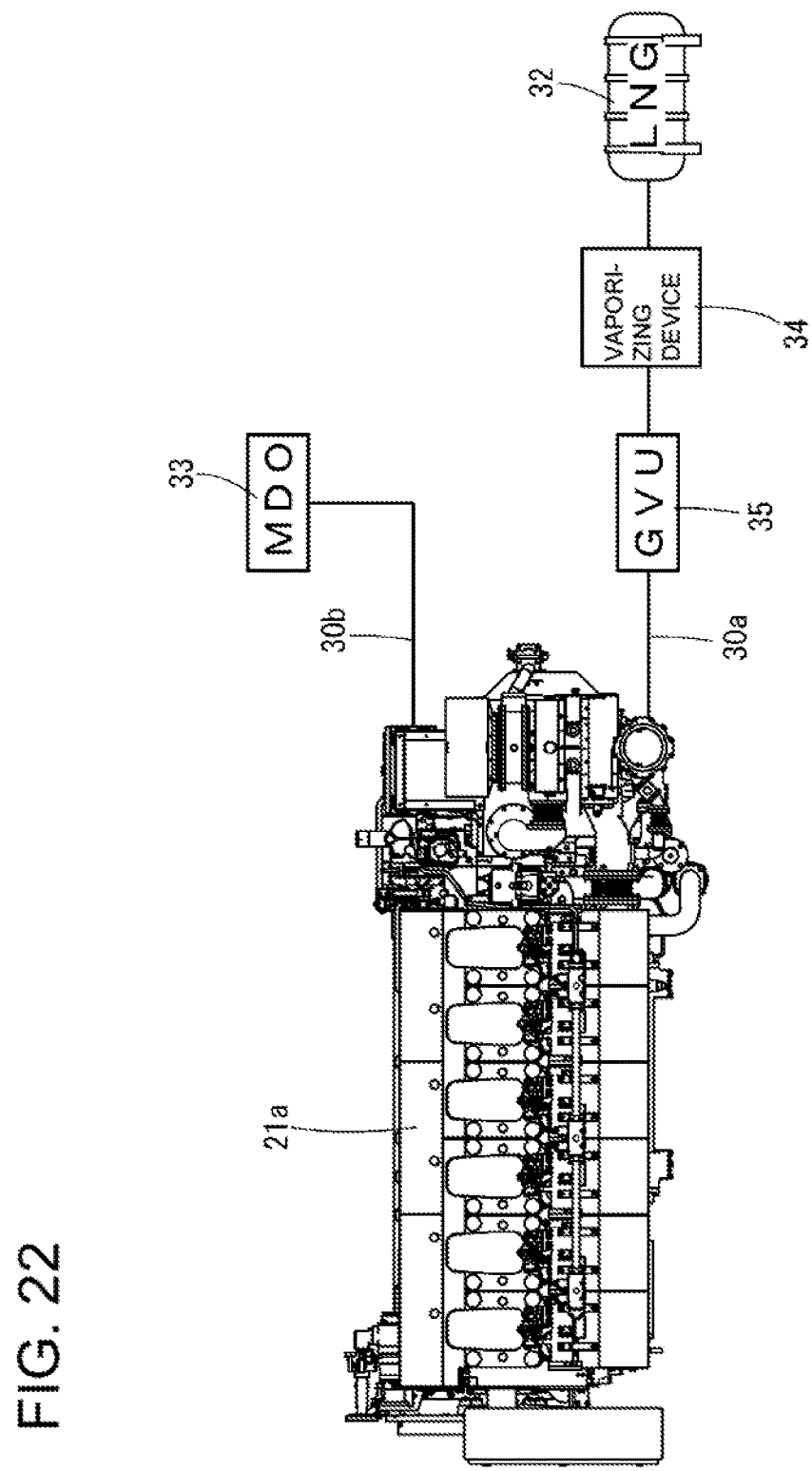
FIG. 22 A schematic view showing a structure of a fuel supply path of an engine device in a second embodiment of the present invention.

As shown in FIG. 22, the engine device 21a of the present embodiment is such that fuel is supplied from two systems of fuel supply paths 30, 31, and one of the fuel supply paths 30a is connected to a gas fuel tank 32, while the other one of the fuel supply paths 30b is connected to a liquid fuel tank 33. That is, the engine device 21 is structured so that the fuel gas is supplied from the fuel supply path 30a to the engine device 21, and that fuel oil is supplied to the engine device 21 from the fuel supply path 30b. The fuel supply path 30a includes: a gas fuel tank 32 configured to store liquefied gaseous fuel; a vaporizing device 34 configured to vaporize the liquefied fuel (fuel gas) in the gas fuel tank 32; and a gas valve unit 35 configured to adjust a fuel gas supply amount from the vaporizing device 34 to the engine device 21. That is, in the structure of the fuel supply path 30a, the vaporizing device 34 and the gas valve unit 35 are arranged in this order from the gas fuel tank 32 towards the engine device 21.

Figure 23:
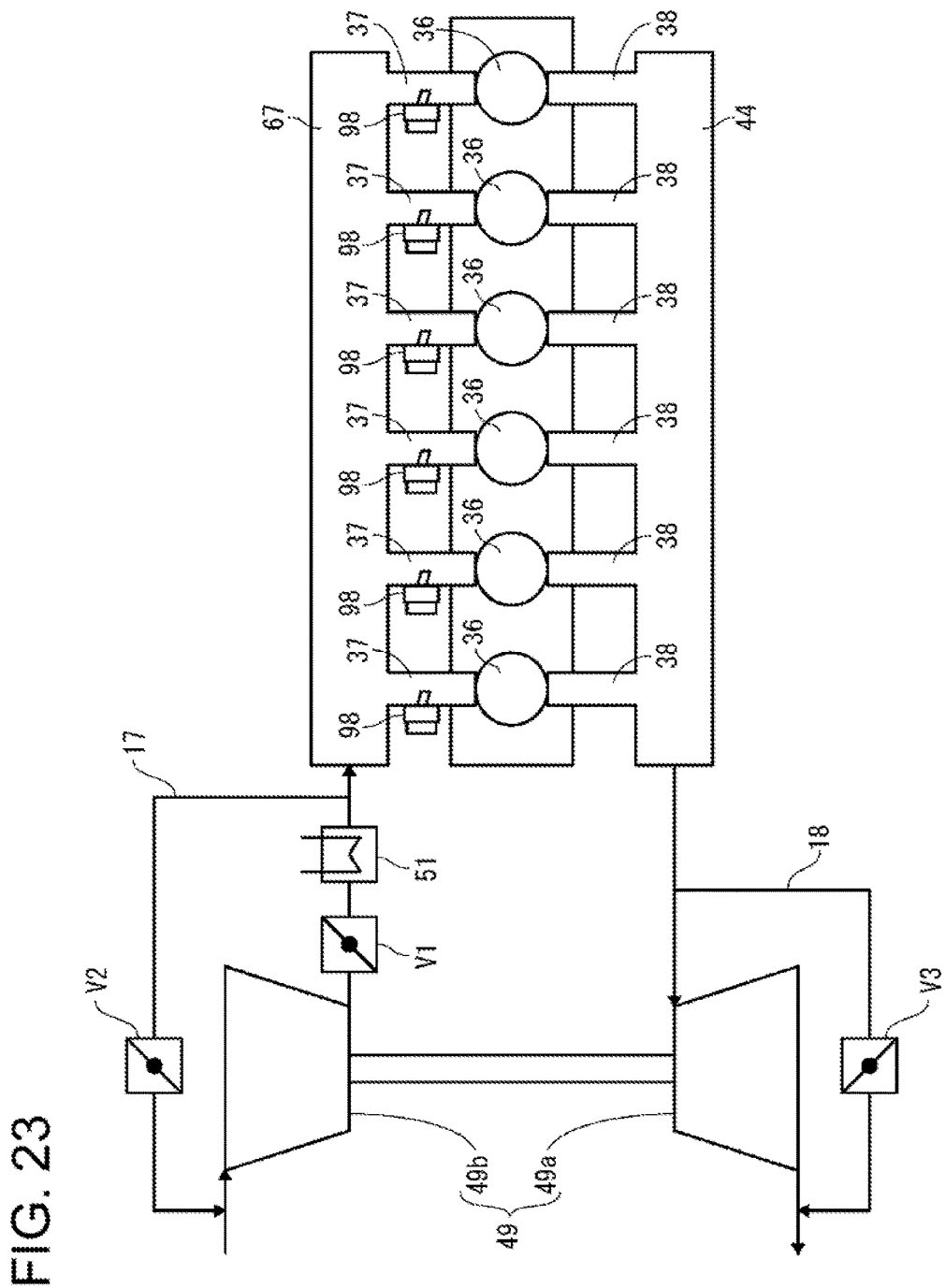
FIG. 23 A schematic view schematically illustrating the structure of an intake/exhaust passage in the engine device.

As shown in FIG. 23, the engine device 21a has a structure in which a plurality of cylinders 36 (6 cylinders in the present embodiment) are serially aligned in a later-described cylinder block 25. Each cylinder 36 is in communication with an intake manifold (intake passage) 67 structured in the cylinder block 25, through an intake port 37. Each cylinder 36 is in communication with an exhaust manifold (exhaust gas passage) 44 arranged above the cylinder heads 26, through an exhaust port 38. To the intake port 37 of each cylinder 36, a gas injector 98 is arranged.

An exhaust gas outlet side of the exhaust manifold 44 is connected to an exhaust gas inlet of a turbine 49a of a turbocharger 49 is connected. An air inlet side (fresh air inlet side) of the intake manifold 67 is connected to an air ejection port (fresh air outlet) of an intercooler 51. An air inlet port (fresh air inlet) of the intercooler 51 is connected to the air ejection port (fresh air outlet) of a compressor 49b of the turbocharger 49. Between the compressor 49b and the intercooler 51, a main throttle valve V1 is arranged. By adjusting the valve opening degree of the main throttle valve V1, the flow rate of air to be supplied to the intake manifold 67 is adjusted.

A supplied-air bypass passage 17 configured to circulate a part of the air exhausted from the outlet of the compressor 49b to the inlet of the compressor 49b connects the air inlet port (fresh air inlet) side of the compressor 49b with the air outlet side of the intercooler 51. That is, the supplied-air bypass passage 17 is opened to the outside air on the upstream side of the air inlet port of the compressor 49b, while being connected to a connection part of the intercooler 51 and the intake manifold 67. On this supplied-air bypass passage 17, a supplied-air bypass valve V2 is arranged. By adjusting the valve opening degree of the supplied-air bypass valve V2, the flow rate of air from the downstream side of the intercooler 51 to the intake manifold 67 is adjusted.

The exhaust bypass passage 18 which bypasses the turbine 49a connects the exhaust gas outlet side of the turbine 49a and the exhaust gas outlet side of the exhaust manifold 44. That is, the exhaust bypass passage 18 is opened to the outside air on the downstream side of the exhaust gas outlet of the turbine 49a, while being connected to a connection part of the exhaust gas outlet of the turbine 49a and the exhaust gas inlet of the turbine 49a. On this exhaust bypass passage 18, an exhaust bypass valve V3 is arranged. By adjusting the valve opening degree of the exhaust bypass valve V3, the exhaust gas flow rate flowing in the turbine 49a, and adjust the air compression amount in the compressor 49b.

The engine device 21a includes: a turbocharger 49 configured to compress the air by the exhaust gas from the exhaust manifold 44; and an intercooler 51 configured to cool compressed air compressed by the turbocharger 49 and supply the compressed air to the intake manifold 67. In the engine device 21a, the main throttle valve V1 is provided at the connecting portion between the outlet of the turbocharger 49 and the inlet of the intercooler 51. The engine device 21 includes an exhaust bypass passage 18 connecting an outlet of the exhaust manifold 44 and an exhaust gas outlet of the turbocharger 49, and an exhaust bypass valve V3 is arranged in the exhaust bypass passage 18. In cases of optimizing the turbocharger 49 for a diesel mode specification, an air-fuel ratio suitable for an engine load is achieved even in the gas mode, by controlling the opening degree of the exhaust bypass valve V3 according to fluctuation in the engine load. Therefore, shortage and surplus in the air amount necessary for combustion can be prevented at a time of load fluctuation, and the engine device 21a is suitably operated in the gas mode, even if the turbocharger optimized for the diesel mode is used.

The engine device 21a includes the supplied-air bypass passage 17 configured to bypass the turbocharger 49, and the supplied-air bypass valve V2 is arranged in the supplied-air bypass passage 17. By controlling the opening degree of the supplied-air bypass valve V2 according to fluctuation in the engine load, air that matches with the air-fuel ratio required for combustion of the fuel gas is supplied to the engine. Further, by performing in combination a control operation by the supplied-air bypass valve V2 with a good responsiveness, the response speed to the load fluctuation during the gas mode can be accelerated.

In the engine device 21a, the supplied-air bypass passage 17 is connected in a position between the inlet of the intercooler 51 and the main throttle valve V1, the compressed air ejected from the compressor 49b is circulated to the inlet of the compressor 49b. This way, the responsiveness of the flow rate control by the exhaust bypass valve V3 is compensated by the supplied-air bypass valve V2, and the control band of the supplied-air bypass valve V2 is compensated by the exhaust bypass valve V3. Therefore, the followability of the air-fuel ratio control during the gas mode can be made favorable, when the load fluctuation takes place or at a time of switching the operation mode in a shipboard application.

Figure 24:
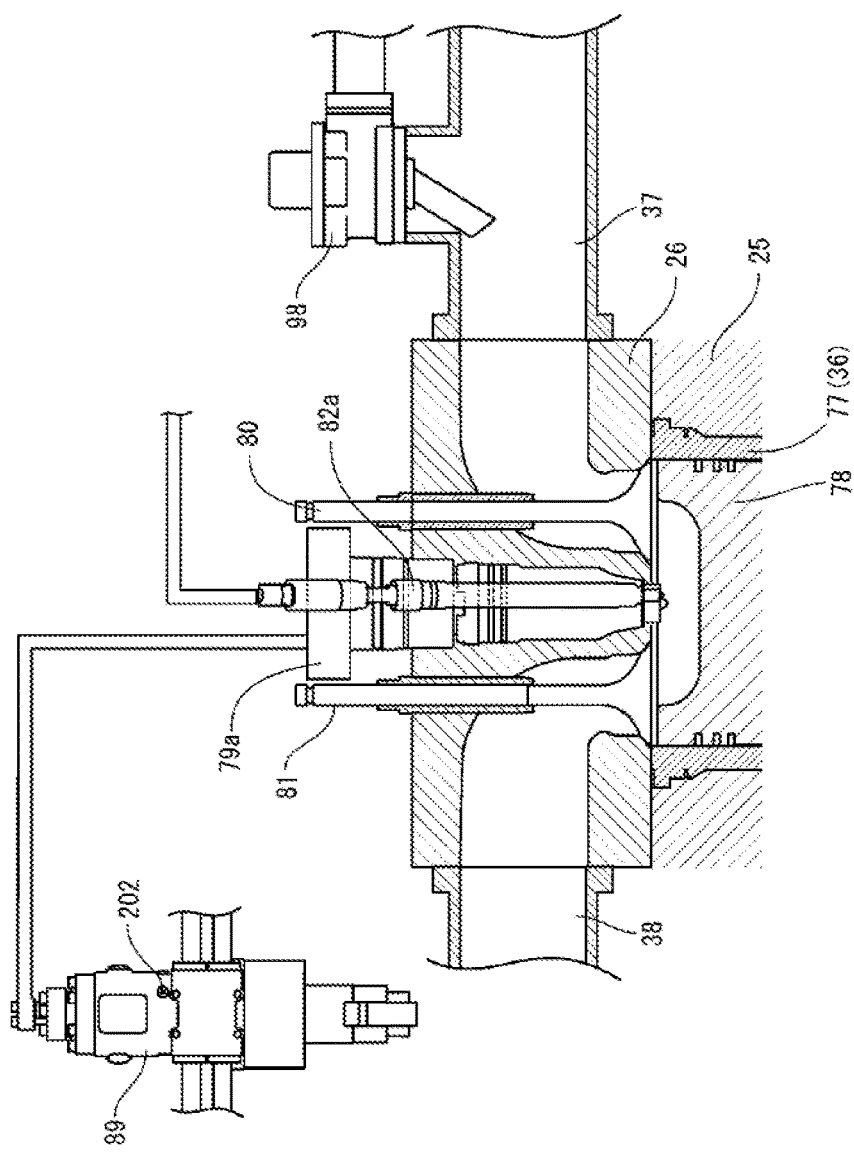
FIG. 24 A schematic view schematically illustrating the structure of the inside of a cylinder head in the engine device.

As shown in FIG. 24, in the engine device 21a, a cylinder 77 (cylinder 36) having a cylindrical shape is inserted in the cylinder block 25. By having the piston 78 reciprocating in the up-down directions in the cylinder 77, the engine output shaft 24 on the lower side of the cylinder 77 is rotated. On each of the cylinder heads 26 on the cylinder block 25, a main fuel injection valve 79a which receives fuel oil (liquid fuel) from fuel oil pipes has its leading end inserted into the cylinder 77. This main fuel injection valve 79a has its leading end arranged in a center position on the upper end surface of the cylinder 77, and injects the fuel oil into the main combustion chamber structured by the upper surface of the piston 78 and the inner wall surface of the cylinder 77. Therefore, while the engine device 21a is driven in the diffusion combustion mode, the fuel oil is injected from the fuel injection valve 79*a* into the main combustion chamber in the cylinder 77, and reacts with the compressed air to cause diffusion combustion.

In each cylinder head 26, an intake valve 80 and an exhaust valve 81 are installed on the outer circumference side of the main fuel injection valve 79*a*. When the intake valve 80 opens, the air from the intake manifold 67 is taken into the main chamber in the cylinder 77. On the other hand, when the exhaust valve 81 opens, the combustion gas (exhaust gas) in the main combustion chamber in the cylinder 77 is exhausted to the exhaust manifold 44. By having a push rod (not shown) reciprocating up and down according to the rotation of the cam shaft (not shown), the locker arm (not shown) swings to reciprocate the intake valve 80 and the exhaust valve 81 in the up and down.

A pilot fuel injection valve 82*a* that generates ignition flames in the main combustion chamber is obliquely inserted with respect to the cylinder head 26 so its leading end is arranged nearby the leading end of the main fuel injection valve 79*a*. The pilot fuel injection valve 82*a* adopts a micro pilot injection method and has, on its leading end, a sub chamber from which pilot fuel is injected. That is, in the pilot fuel injection valve 82*a*, the pilot fuel supplied from the common-rail (not shown) is injected into the sub chamber and combusted, to generate ignition flame in the center position of the main combustion chamber in the cylinder 77. Therefore, while the engine device 21*a* is driven in the premixed combustion mode, the ignition flame generated by the pilot fuel injection valve 82*a* causes reaction of a premixed gas which is supplied in the main combustion chamber of the cylinder 77 through the intake valve 80, thus leading to premixed combustion.

Figure 25:
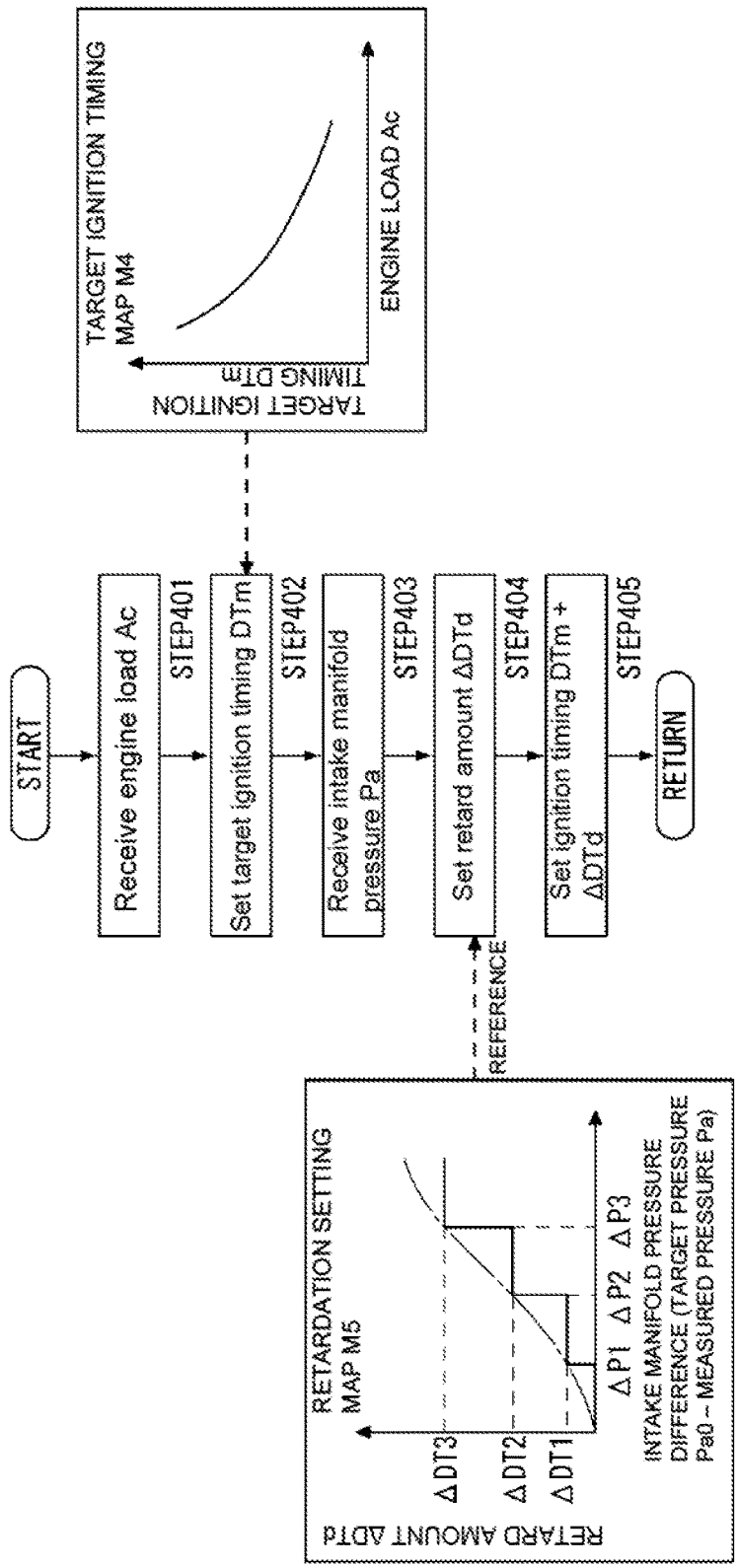
FIG. 25 A flowchart showing operations in a setting control of ignition timing by an engine controlling device of the second Embodiment.

As shown in FIG. 25, in the gas mode operation of the engine device 21*a* of the second embodiment, the engine controlling device 73 sets the target ignition timing Dtm by referring to the target ignition timing map M4, and sets a retard amount ΔDTd by referring to a retardation setting map M5, to cause ignition by the pilot fuel injection valve 82*a* at an ignition timing DTm+ΔDTd. The target ignition timing map M4 indicates the correlation between the engine load (generator output or engine torque) Ac measured by the load measuring device 19 and the target ignition timing DTm, and is for determining the target ignition timing DTm with respect to the engine load Ac. The retardation setting map M5 indicates the correlation between a parameter based on which prediction of insufficiency in the air amount is based and the retard amount ΔDTd, and is for determining the retard amount ΔDTd with respect to the predicted air amount insufficient state.

As shown in FIG. 25, in the retardation setting map M5, the retard amount ΔDTd is varied in multiple steps according to the difference (Pa0−Pa) between the target value Pa0 (target pressure) of the intake manifold pressure and the measured value Pa (measured pressure) of the intake manifold pressure. That is, when the intake manifold pressure differential (Pa0−Pa) is ΔP1 or higher, the retard amount ΔDTd is set to a value ΔDT1. When the intake manifold pressure differential (Pa0−Pa) is ΔP2 (ΔP2>ΔP1) or higher, the retard amount ΔDTd is set to a value ΔDT2 (ΔP2>ΔP1). When the intake manifold pressure differential (Pa0−Pa) is ΔP3 (ΔP3>ΔP2) or higher, the retard amount ΔDTd is set to a value ΔDT3 (ΔP3>ΔP2). That is, the retardation setting map M5 intermittently stores values of the retard amount which is monotonically increased with respect to the difference resulting from subtracting the measured pressure from the target pressure.

The following details the setting control for the ignition timing by the engine controlling device 73 during operation in the gas mode, with reference to flowchart of FIG. 25. The present embodiment deals with an example where the air amount insufficient state is predicted based on a difference (Pa0−Pa) between the target value Pa0 (target pressure) of the intake manifold pressure and a measured value Pa (measured pressure) of the intake manifold pressure.

As shown in FIG. 25, when the engine load (generator output or engine torque) Ac measured by the load measuring device 19 is received (STEP 401), the engine controlling device 73 determines and stores a target ignition timing (ordinary ignition timing) DTm for the pilot fuel injection valve 82*a*, with reference to target ignition timing map M4 (STEP 402). After the target ignition timing DTm is determined, the engine controlling device 73 obtains a value Pa (measured pressure) of the intake manifold pressure measured by the intake manifold pressure sensor 39 (STEP 403).

Then, referring to the retardation setting map M5, the engine controlling device 73 determines the retard amount ΔDTd based on a difference (Pa0−Pa) between the target value Pa0 (target pressure) of the intake manifold pressure set in the valve control operation and the like, and the value Pa (measured pressure) of the intake manifold pressure (STEP 404). Then, the engine controlling device 73 sets an ignition timing DTm+ΔDTd based on the target ignition timing DTm stored in the STEP 401 and the retard amount ΔDTd determined in STEP 404 (STEP 405).

Figure 26:
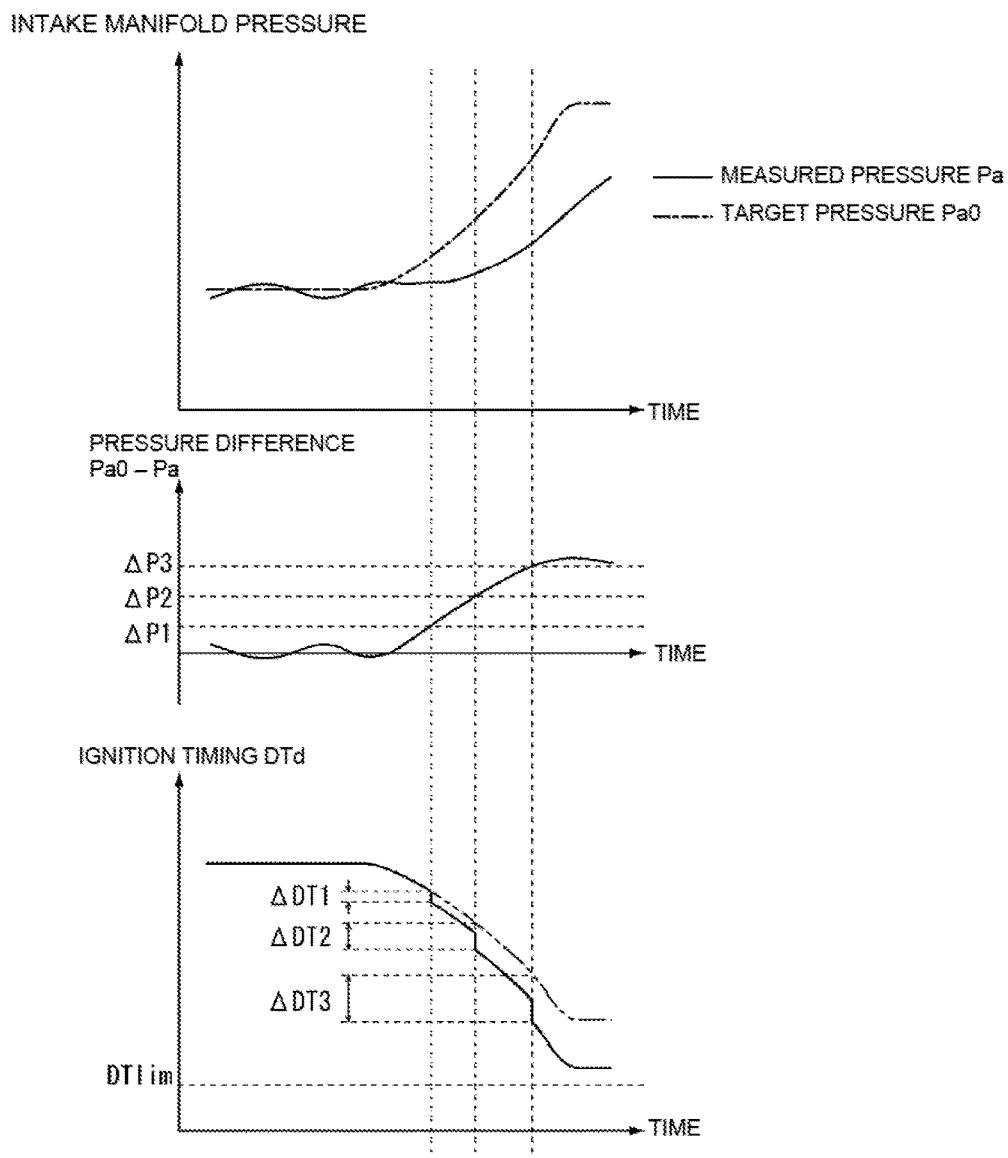
FIG. 26 A time chart of the control.

In the setting control of the ignition timing by the engine controlling device 73, the retard amount is determined according to the difference between the target pressure Pa0 and the measured pressure Pa by referring to the retardation setting map M5, as shown in FIG. 26. Therefore, the ignition timing can be retarded in multiple steps according to the predicted insufficient amount of air based on the difference between the target pressure Pa0 and the measured pressure Pa. Accordingly, while the probability of knocking taking place due to fluctuation in the output, a drop in the thermal efficiency (engine output efficiency) is suppressed to the minimum.

It should be noted that, in the above setting control of the ignition timing during the gas mode operation, the surplus and shortage of the amount of air is confirmed based on the difference between the target pressure Pa0 and the measured pressure Pa; however, the surplus and shortage of the air amount may be confirmed based on a different parameter. The following describes a first modification of the setting control of the ignition timing by the engine controlling device 73, with reference to the flowchart of FIG. 27. It should be noted that, in the flowchart of FIG. 27, operation steps identical to those in the flowchart of FIG. 25 refer to the above-description, and detail description for those steps are omitted.

In the present modification, the engine controlling device 73 refers to the target ignition timing map M4 to determine the target ignition timing DTm based on the engine load Ac (STEP 401 to STEP 402), and then receives the measured value Fa (measured flow rate) of the air flow rate (intake manifold flow rate) in the intake manifold 67 from a flow rate sensor (not shown) (STEP 413). Then, the engine controlling device 73 refers to retardation setting map M5A and determines the retard amount ΔDTd (STEP 414) and sets the ignition timing DTm+ΔDTd (STEP 405) based on a difference (Fa0−Fa) between the target value Fa0 (target flow rate) of the intake manifold flow rate set based on the engine load Ac and the like and the measured value Fa (measured flow rate) of the intake manifold flow rate. It should be noted that the retardation setting map M5A intermittently stores values of the retard amount which is monotonically increased with respect to the difference resulting from subtracting the measured flow rate from the target flow rate.

Figure 28:
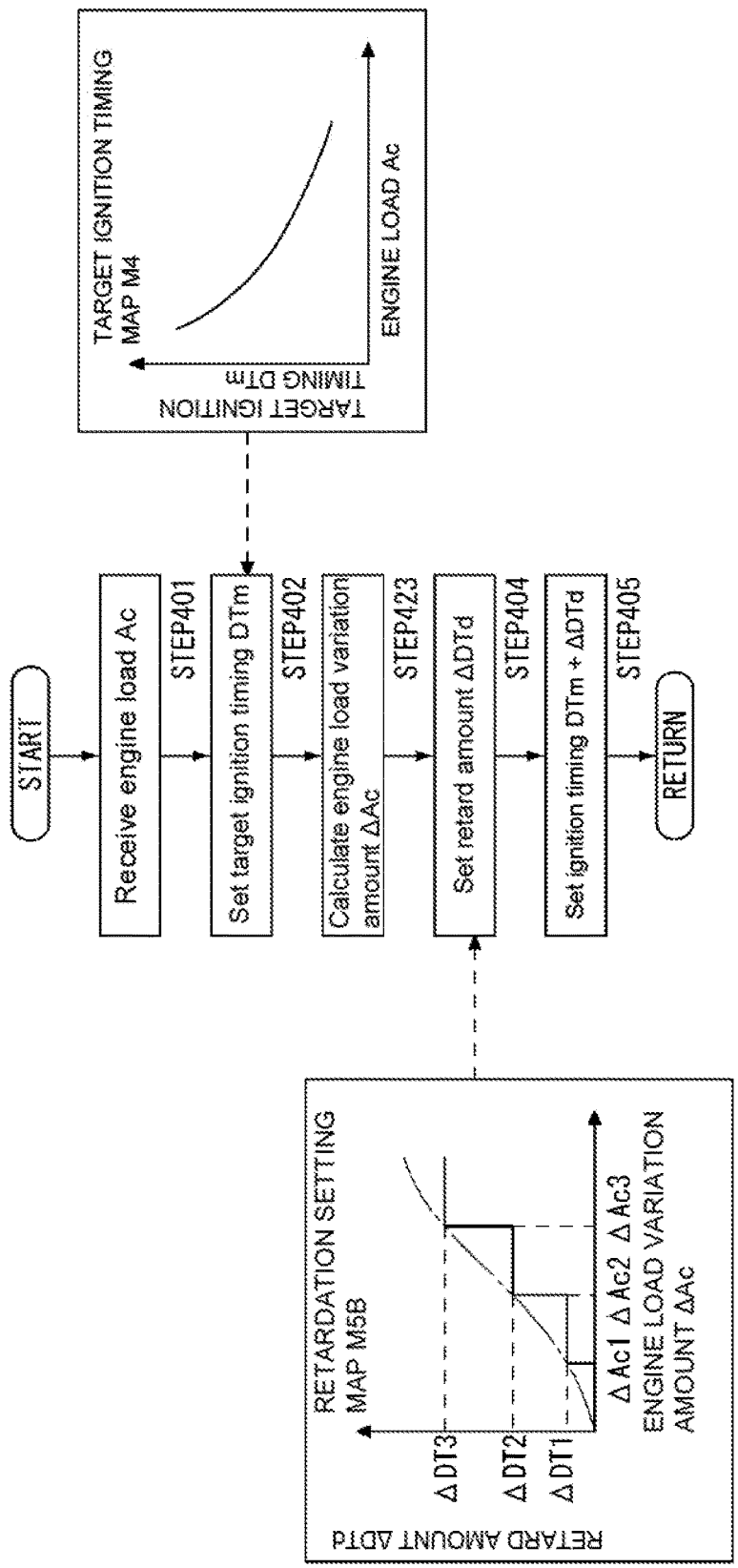
FIG. 28 A flowchart of a second modification, showing operations in a setting control of ignition timing by an engine controlling device of the second embodiment.

The following details a second modification of the setting control of the ignition timing by the engine controlling device 73, with reference to flowchart of FIG. 28. It should be noted that, in the flowchart of FIG. 28, operation steps identical to those in the flowchart of FIG. 25 refer to the above-description, and detail description for those steps are omitted.

In the present modification, the engine controlling device 73 refers to the target ignition timing map M4 to determine the target ignition timing based on the engine load Ac (STEP 401 to STEP 402), and then calculates a variation amount of the engine load Ac (output variation amount) ΔAc (STEP 423). At this time, for example, the output variation amount ΔAc may be calculated based on a difference from the previously measured engine load Ac. Then, the engine controlling device 73 refers to the retardation setting map MSB, and determines the retard amount ΔDTd (STEP 424) and sets an ignition timing DTm+ΔDTd (STEP 405), based on the output variation amount ΔAc. It should be noted that the retardation setting map M5B intermittently stores values of the retard amount which is monotonically increased with respect to the output variation amount ΔAc.

Further, the retardation setting map M5 may be a 3-dimensional map indicating the correlation amongst a parameter based on which the insufficient state of the air amount is predicted, an engine load (generator output or the engine torque) Ac, and the retard amount ΔDTd, instead of the above 2-dimensional map. That is, in the example of the flowchart of FIG. 25, the retard amount ΔDTd is determined in STEP 404, based on the difference (Pa0−Pa) between the target pressure Pa0 and the measured pressure Pa, and the engine load Ac, referring to the retardation setting map M5C shown in FIG. 29. Since the retard control can be more accurately executed by referring to the 3-dimensional retardation setting map M5C as described above, deterioration in the thermal efficiency (engine output efficiency) is restrained, while preventing knocking.

Figure 29:
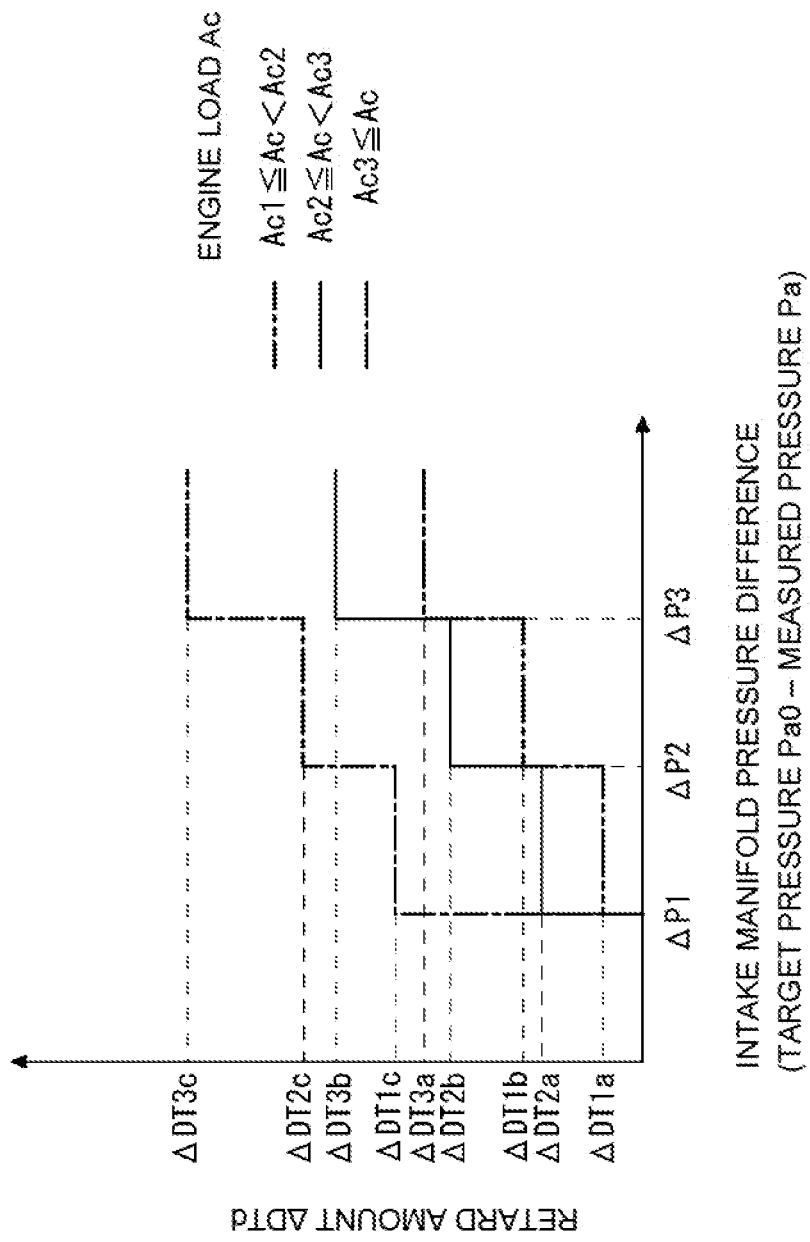
FIG. 29 A diagram showing a retardation setting map in a third modification of the setting control of ignition timing by an engine controlling device of the second embodiment.

In the example of the retardation setting map M5C shown in FIG. 29, where the engine load Ac is Ac1 or higher but less than Ac2, the retard amount ΔDTd is set to a value of ΔDT1a when the intake manifold pressure difference (Pa0−Pa) becomes ΔP1 or higher, the retard amount ΔDTd is set to a value of ΔDT2a (ΔDT2a>ΔDT1a) when the intake manifold pressure difference (Pa0−Pa) becomes ΔP2 or higher, and the retard amount ΔDTd is set to a value of ΔDT3a (ΔDT3a>ΔDT2a) when the intake manifold pressure difference (Pa0−Pa) becomes ΔP3 or higher, as shown by the two-dot chain line in the figure.

Further, where the engine load Ac is Ac2 or higher but less than Ac3, the retard amount ΔDTd is set to a value of ΔDT1b (ΔDT1b>ΔDT1a) when the intake manifold pressure difference (Pa0−Pa) becomes ΔP1 or higher, the retard amount ΔDTd is set to a value of ΔDT2b (ΔDT2b>ΔDT1b and ΔDT2b>ΔDT2a) when the intake manifold pressure difference (Pa0−Pa) becomes ΔP2 or higher, and the retard amount ΔDTd is set to a value of ΔDT3b (ΔDT3b>ΔDT2b and ΔDT3b>ΔDT3a) when the intake manifold pressure difference (Pa0−Pa) becomes ΔP3 or higher, as shown in the solid line in the figure.

Further, when the engine load is Ac3 or higher, the retard amount ΔDTd is set to a value of ΔDT1c (ΔDT1c>ΔDT1b) when the intake manifold pressure difference (Pa0−Pa) becomes ΔP1 or higher, the retard amount ΔDTd is set to a value of ΔDT2c (ΔDT2c>ΔDT1c and ΔDT2c>ΔDT2b) when the intake manifold pressure difference (Pa0−Pa) becomes ΔP2 or higher, and the retard amount ΔDTd is set to a value of ΔDT3c (ΔDT3c>ΔDT2c and ΔDT3c>ΔDT3b) when the intake manifold pressure difference (Pa0−Pa) becomes ΔP3 or higher, as shown in a single-dot chain line in the figure.

Figure 27:
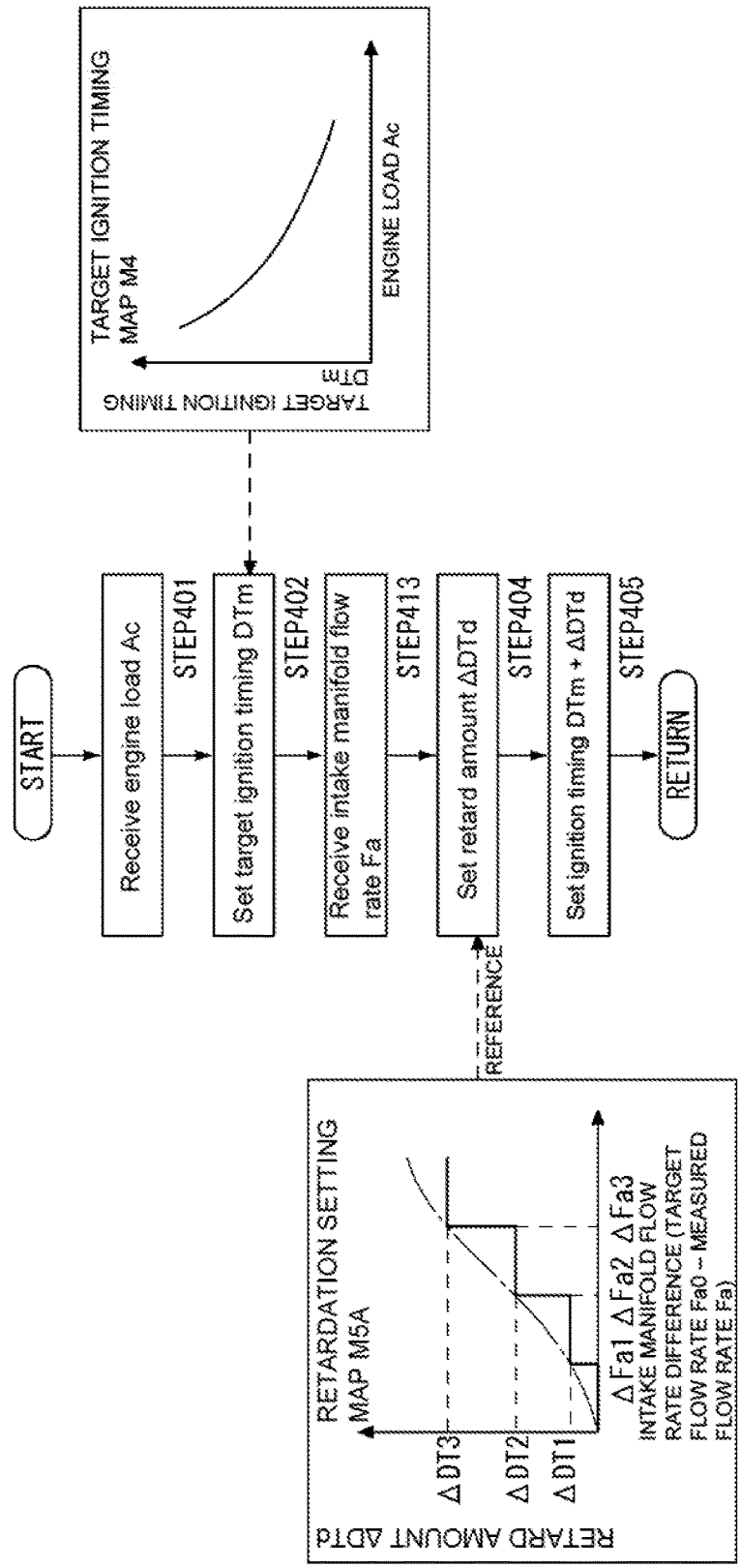
FIG. 27 A flowchart of a first modification, showing operations in a setting control of ignition timing by an engine controlling device of the second Embodiment.

It should be noted that, in cases of setting the retard amount ΔDTd by referring to a 3-dimensional retardation setting map, the retard amount ΔDTd is determined based on a difference (Fa0−Fa) between the target flow rate Fa0 and the measured flow rate Fa and the engine load Ac, in the example of the flowchart in FIG. 27. Further, in the example of the flowchart of FIG. 28, the retard amount ΔDTd is determined based on the variation amount (output variation amount) of the engine load Ac and the engine load Ac.

Further, as in the engine device 21 of the first embodiment, the engine device 21a of the present embodiment can prevent an emergency stop of the engine device 21a at the time of output-loss, by executing the switching control to the temporary control at the time of output-loss based on the flowchart shown in FIG. 20 or FIG. 21. Further, by executing the control operation of the flowchart shown in FIG. 21, the engine device 21a whose output has been lost can be operated temporarily until a transition to the operation of the auxiliary engine 21a. Therefore, the ship or the generator having the engine device 21a will not be stopped. Since an emergency stop can be avoided, even when the output signal of the engine device 21a is lost, navigation of the ship having such an engine device 21a or output of the generator having the engine device 21a can be safely sustained.

The structure of each of the portions is not limited to the illustrated embodiment, but can be variously changed within a scope which does not deflect from the scope of the present invention. Further, the engine device of each of the above-described embodiments can also be applied to structures other than the propulsion/electric power generating mechanism described above, such as a generator device for supplying electric power to an electric system in a ship hull and a structure as a drive source in the land-based power generating facility.

Further, although the gas engine is described as an example of the engine device of the first embodiment, each control operation described above can be applied when the dual-fuel engine is driven in the gas mode in which the gaseous fuel is combusted. Meanwhile, although the dual-fuel engine is described as an example of the engine device of the second embodiment, each control operation in the gas mode described above can be applied to a gas engine in which the gaseous fuel is combusted.

REFERENCE SIGNS LIST 1 ship
2 ship hull
4 funnel
5 propeller
9 propeller shaft
11 engine room
12 propulsion/electric power generating mechanism
17 supplied-air bypass passage
19 load measuring device
20 engine rotation sensor
21 engine device (gas engine device)
22 speed reducer
23 generator 24 output shaft (crank shaft)
25 cylinder block
26 cylinder head
30 main fuel gas passage
31 sub fuel gas passage
36 gas column
37 intake port
38 exhaust port
39 pressure sensor
40 head cover
41 main fuel gas pipe
42 sub fuel gas pipe
43 side cover
44 exhaust manifold
45 thermal insulation cover
48 exhaust gas relay pipe
49 turbocharger
49a turbine
49b compressor
51 intercooler
63 intake filter
64 fresh air passage pipe
66 supplied-air bypass pipe
67 intake manifold
73 engine controlling device
79 igniter
80 intake valve
81 exhaust valve
82 spark plug
89 check valve
98 gas injector
110 main fuel gas pressure regulator
111 sub fuel gas pressure regulator
112 main fuel gas pressure sensor
113 main fuel gas temperature sensor
114 sub fuel gas pressure sensor
115 lubricating oil temperature sensor
V1 intake throttle valve
V2 supplied-air bypass valve
V3 exhaust bypass valve

The invention claimed is:

1. An engine device, comprising:
an intake manifold configured to supply air into a cylinder, a gas injector configured to mix fuel gas with air supplied from the intake manifold, and supply mixed gas to the cylinder, and an igniter configured to ignite, in the cylinder, premixed fuel obtained by pre-mixing the fuel gas with the air, the engine device further comprising:
a control unit configured to execute a combustion control of the premixed fuel based on an output signal indicative of an output from the engine device, wherein
when the output signal is lost, the control unit estimates an output signal based on a fuel gas injection amount from the gas injector, and executes the combustion control based on the estimated output signal.

2. The engine device according to claim 1, wherein the control unit sets a target value of an intake manifold pressure based on the estimated output signal, and executes the combustion control.

3. The engine device according to claim 1, wherein the control unit sets a target value of a fuel gas injection amount based on the estimated output signal, and executes the combustion control.

4. The engine device according to claim 1, wherein, when the output signal is lost, the control unit executes the combustion control based on the estimated signal, until a separate auxiliary engine starts its operation.

5. The engine device according to claim 1, wherein:
the engine device is a gas engine configured to drive and rotate a generator, and
the control unit receives an output from the generator as the estimated output signal and executes the combustion control.

6. The engine device according to claim 1, wherein:
the engine device is a dual-fuel engine capable of selecting a gaseous fuel or a liquid fuel, and
the control unit receives an engine torque as the estimated an output signal and executes the combustion control.

* * * * *